US012423657B2

(12) United States Patent
Vinayaka et al.

(10) Patent No.: US 12,423,657 B2
(45) Date of Patent: *Sep. 23, 2025

(54) MACHINE LEARNING-BASED ANOMALY DETECTION AND ACTION GENERATION SYSTEM FOR SOFTWARE DEVELOPMENT LIFECYCLE MANAGEMENT

(71) Applicant: Citibank, N.A., New York, NY (US)

(72) Inventors: Mayank Vinayaka, Irving, TX (US); Ryan Peterman, Jacksonville, FL (US); Badari Narayana Shanka Prasad, Irving, TX (US); Richard Lawton, Irving, TX (US); Vitthal Ramling Betgar, New York, NY (US); Adar Danait, New York, NY (US); Balaji Kumar, New York, NY (US); Robin J. Kurian, New York, NY (US); Maneet Sharma, New York, NY (US); Anantha Veerasami, New York, NY (US)

(73) Assignee: CITIBANK, N.A.

( * ) Notice: Subject to any disclaimer, the term of this patent is extended or adjusted under 35 U.S.C. 154(b) by 0 days.

This patent is subject to a terminal disclaimer.

(21) Appl. No.: 19/171,161

(22) Filed: Apr. 4, 2025

(65) Prior Publication Data
US 2025/0232260 A1 Jul. 17, 2025

Related U.S. Application Data

(63) Continuation-in-part of application No. 18/925,536, filed on Oct. 24, 2024, now Pat. No. 12,288,192,
(Continued)

(51) Int. Cl.
G06Q 10/10 (2023.01)
G06Q 10/06 (2023.01)
(Continued)

(52) U.S. Cl.
CPC ... *G06Q 10/103* (2013.01); *G06Q 10/063114* (2013.01)

(58) Field of Classification Search
CPC .............. G06Q 10/103; G06Q 10/067; G06Q 10/063114
(Continued)

(56) References Cited

U.S. PATENT DOCUMENTS 10,503,478 B2 12/2019 Maurya et al.
11,093,370 B1 8/2021 Sivanantham et al.
(Continued)

Primary Examiner — Jonathan P Ouellette
(74) Attorney, Agent, or Firm — Perkins Coie LLP

(57) ABSTRACT

Systems and methods for enhanced software development lifecycle management using a pipeline of machine learning and adaptive models for anomaly detection and termination. In some aspects, the system may generate a system data stream for an SDLC management platform that stitches together source data from multiple sources, generates a query to a first machine learning model for a user story identifier to generate trend information and anomalies, based on output from a second machine learning model including dynamic thresholds for the anomalies, determining at least one anomaly that satisfies a corresponding dynamic threshold, based on output from an adaptive model not including recommended actions to address the at least one anomaly, executing a kill switch for the corresponding user story identifier and generating for inclusion in the graphical user interface an indication of the kill switch.

20 Claims, 18 Drawing Sheets

Related U.S. Application Data which is a continuation-in-part of application No. 18/380,114, filed on Oct. 13, 2023, now Pat. No. 12,236,400, which is a continuation of application No. 18/124,870, filed on Mar. 22, 2023, now Pat. No. 11,797,936.

(51) Int. Cl.
  *G06Q 10/0631* (2023.01)
  *G06Q 10/101* (2023.01)

(58) Field of Classification Search
  USPC .................................................. 705/1.1–912
  See application file for complete search history.

(56) References Cited

U.S. PATENT DOCUMENTS

| | | | | |
|---|---|---|---|---|
| 11,151,023 | B2* | 10/2021 | Gupta | G06N 20/00 |
| 11,625,237 | B2* | 4/2023 | Decrop | H04L 63/1425 |
| | | | | 717/106 |
| 11,770,398 | B1* | 9/2023 | Erlingsson | G06F 16/3329 |
| | | | | 709/224 |
| 12,299,427 | B1* | 5/2025 | Pal | G06F 9/451 |
| 2016/0055079 | A1 | 2/2016 | Hanna | |
| 2020/0250548 | A1* | 8/2020 | Shwartz | G06F 9/542 |
| 2021/0326239 | A1 | 10/2021 | Vaughan | |
| 2022/0092481 | A1* | 3/2022 | Neithalath | G06N 20/20 |
| 2022/0342663 | A1 | 10/2022 | Barkaee | |
| 2023/0004486 | A1* | 1/2023 | Drozhak | G06F 11/3692 |
| 2023/0018199 | A1* | 1/2023 | Mahamuni | G06F 11/3051 |
| 2023/0065424 | A1 | 3/2023 | Jain et al. | |
| 2023/0065530 | A1 | 3/2023 | Mohanty | |
| 2023/0128700 | A1* | 4/2023 | Maes | G06Q 10/103 |
| | | | | 705/301 |
| 2023/0130027 | A1* | 4/2023 | Mason | G06F 11/3692 |
| | | | | 717/124 |
| 2023/0261876 | A1 | 8/2023 | Kumar et al. | |
| 2023/0273908 | A1* | 8/2023 | Souza Vaz | G06F 11/004 |
| | | | | 707/609 |
| 2023/0274160 | A1* | 8/2023 | Mujumdar | G06N 5/022 |
| | | | | 706/12 |
| 2023/0315397 | A1* | 10/2023 | Prasad Tanniru | G06F 8/33 |
| 2024/0244070 | A1* | 7/2024 | Mohapatra | H04L 63/1425 |
| 2024/0289745 | A1* | 8/2024 | Larkin | G06F 21/572 |
| 2025/0021464 | A1* | 1/2025 | Lang | G06F 11/3612 |
| 2025/0053752 | A1* | 2/2025 | Ayachitula | G06F 40/40 |
| 2025/0077631 | A1* | 3/2025 | Desikan | G06F 21/12 |
| 2025/0094271 | A1* | 3/2025 | Chen | G06F 11/3006 |
| 2025/0117492 | A1* | 4/2025 | Schneider | G06F 21/577 |

\* cited by examiner

200

```
Generate a system data stream for an SDLC management platform that stitches together data from
a plurality of computing systems 202
                                        ↓
Train a machine learning model based on the system data stream to generate progress information
and one or more execution risks for an input user story identifier 204
                                        ↓
Generate a query to the machine learning model for each user story identifier of the plurality of user
stories corresponding to the SDLC management platform 206
                                        ↓
Based on output from the machine learning model, generate a graphical user interface displayable
on a client device 208
                                        ↓
For each user story included in the graphical user interface, bind, to two or more controls on the
graphical user interface, the progress information for the user story 210
                                        ↓
For each user story included in the graphical user interface, based on the one or more execution
risks for the user story, generate an event-based view of prior actions and one or more
recommended actions to address the one or more execution risks 212
```

*FIG. 2*

MACHINE LEARNING-BASED ANOMALY DETECTION AND ACTION GENERATION SYSTEM FOR SOFTWARE DEVELOPMENT LIFECYCLE MANAGEMENT

CROSS REFERENCE TO RELATED APPLICATIONS

This application is a continuation-in-part of U.S. patent application Ser. No. 18/925,536, filed Oct. 24, 2024, which is a continuation-in-part of U.S. patent application Ser. No. 18/380,114, filed Oct. 13, 2023, which is a continuation of U.S. patent application Ser. No. 18/124,870, filed Mar. 22, 2023, each of which is hereby incorporated by reference herein in its entirety.

BACKGROUND

In the realm of software engineering, the Software Development Lifecycle (SDLC) is a well-established framework that outlines the process for planning, creating, testing, and deploying an information system. The SDLC aims to produce high-quality software that meets or exceeds customer expectations, reaches completion within time and cost estimates, and is maintainable and scalable. The SDLC process is typically divided into several distinct phases, including requirement analysis, system design, implementation (coding), testing, deployment, and maintenance. Despite the structured approach of the SDLC, traditional methods often face challenges such as inflexibility, prolonged timelines, and difficulty in accommodating changes. Various SDLC models have been developed to address specific issues within the traditional SDLC framework. However, existing software traceability solutions primarily focus on code development, lacking comprehensive end-to-end visibility that encompasses process, software development, and risk management.

BRIEF DESCRIPTION OF THE DRAWINGS

FIG. 2 is a flow diagram illustrating an example process for a software development lifecycle traceability tool that can be executed by the disclosed system in some implementations of the present technology.

Figure 1:
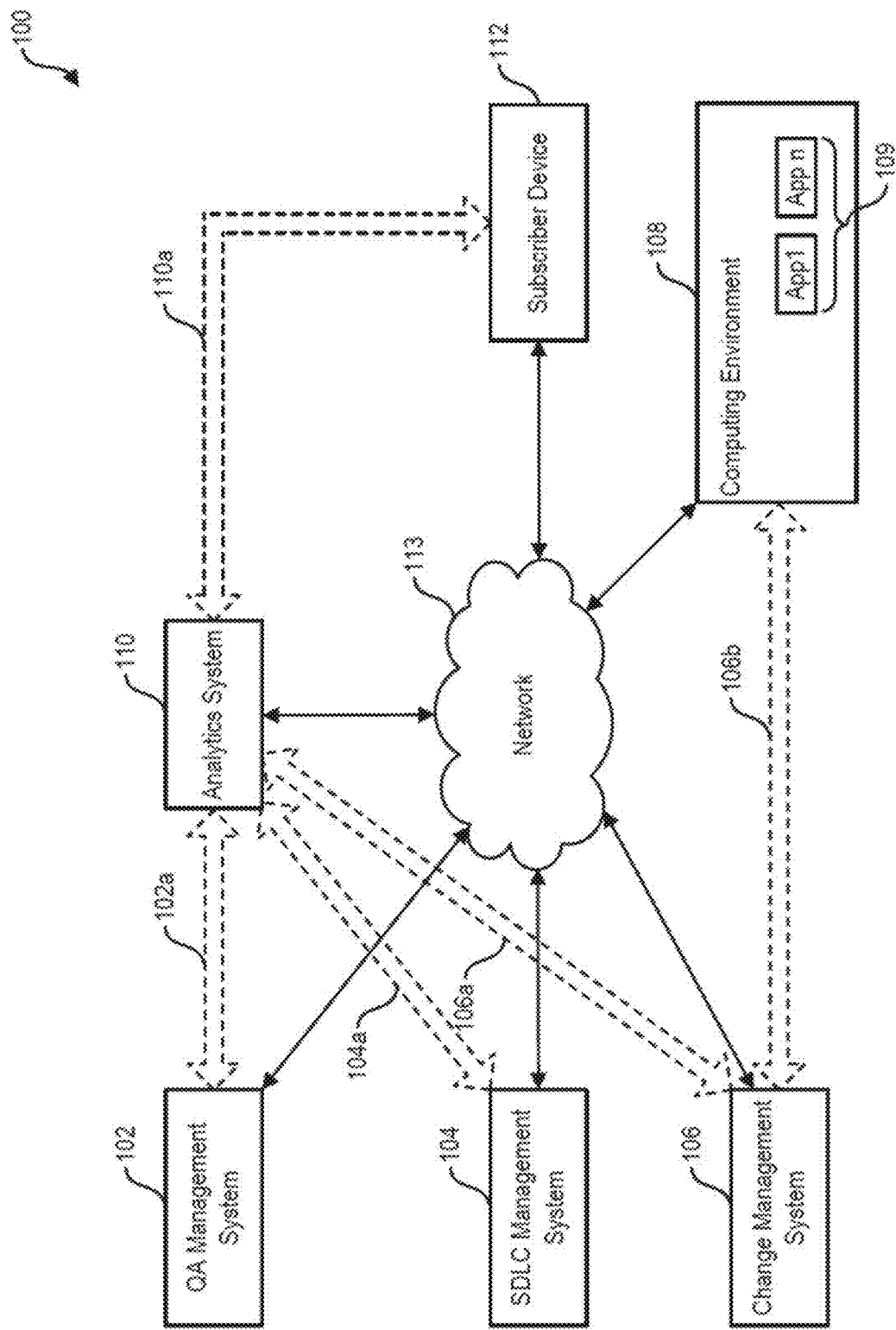
FIG. 1 is a system diagram showing some of the components typically incorporated in at least some of the computer systems and other devices on which the disclosed system operates in accordance with some implementations of the present technology.

The drawings have not necessarily been drawn to scale. For example, the relative sizes of signaling periods in the figures are not to scale, and the size of certain signaling or messaging periods may differ. Similarly, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Conventional approaches to SDLC in large enterprises utilizing distributed software environments face significant challenges in establishing end-to-end traceability of software feature changes. This lack of visibility leads to risks in software delivery, impacts quality and accountability, and increases the likelihood of production incidents that can result in financial, reputational, and/or regulatory damages. This is further exacerbated by inconsistent data collection and manual processes which hinder effective risk management and compliance efforts. Finally, when production incidents occur, many hours are spent by many resources gathering event-based data to form a picture of what led up to the incident and glean insights manually into the root cause and preventative actions for the future.

Developing a system that provides end-to-end traceability and risk management in a distributed software environment presented significant technological uncertainty. The primary challenge was integrating disparate data sources from various tools and platforms used throughout the SDLC, such as JIRA, Git, and Jenkins. Each of these tools has its own data structures, formats, and update frequencies, making it difficult to ensure data consistency and accuracy across the entire SDLC. The complexity was further compounded by the need to handle large volumes of data generated by multiple projects within a large organization. Ensuring that this data could be aggregated, analyzed, and presented in a coherent and actionable manner required overcoming substantial technical hurdles.

Another area of technological uncertainty was the development of machine learning models capable of accurately identifying bottlenecks, risks, and providing actionable recommendations. Training these models required extensive data collection and validation to ensure they could reliably predict issues and suggest effective interventions. The inherent variability and complexity of software development processes meant that the models had to be highly adaptable and capable of learning from a wide range of scenarios. Additionally, the system needed to generate a graphical user interface that could present this information in a user-friendly manner, which involved significant challenges in terms of data visualization and user experience design.

The inventors also faced technological uncertainty in establishing a backward, event-based view of actions taken that led up to a change implementation when incidents occurred in production. This required developing a robust mechanism for tracking and logging every action and event across the SDLC, which could then be analyzed to identify root causes and preventative measures. The challenge was to create a system that could not only capture this data in real-time but also process and analyze it efficiently to provide meaningful insights. This involved experimenting with various logging frameworks and data processing pipelines to ensure that the system could handle the high volume and velocity of data generated in a large enterprise environment.

To address these uncertainties, the inventors systematically evaluated multiple design alternatives. For instance, they experimented with different data integration techniques to ensure seamless data flow between various SDLC tools. One approach involved using middleware to standardize data formats before integration, but this proved to be inefficient due to the high volume of data and the dynamic nature of software development activities. Another alternative was to implement real-time data synchronization mechanisms, which required sophisticated algorithms to handle data conflicts and ensure consistency. The inventors also tested various machine learning algorithms, including supervised and unsupervised learning techniques, to identify the most effective models for predicting risks and generating recommendations. Each of these alternatives presented its own set of challenges and required iterative testing and refinement to achieve the desired level of accuracy and reliability.

The systems and methods described herein provide for a graphical user interface with progress tracking indicia and recommended actions for multiple feature changes (or user stories) to answer questions such as where is the feature change in the SDLC, how can the feature change be enabled to unblock or move faster, and if a blocking incident took place, what prior actions led to it and what recommended actions can be taken to unblock going forward.

Implementing such a graphical user interface that provides end-to-end traceability and risk management can be highly beneficial, but it also comes with several technical challenges. From a technical perspective, integrating data from various tools and platforms used in different stages of the SDLC, such as JIRA for planning, Git for version control, and Jenkins for CI/CD, can be complex. Ensuring data consistency and accuracy across these different systems is crucial for reliable traceability and risk management. Additionally, handling large volumes of data generated throughout the SDLC can be challenging, especially in large organizations with multiple projects. Developing machine learning models that accurately identify bottlenecks, risks, and provide actionable recommendations also requires extensive training and validation.

The systems and methods described herein include a machine learning-powered information system that aggregates and analyzes data from across the entire SDLC. The system may provide a single pane of glass view of the SDLC, highlighting risks, bottlenecks, and outliers. The system may generate actionable recommendations to address identified risks, bottlenecks, and outliers proactively. The system may establish a backward, event-based view of actions taken that led up to a change implementation when incidents have occurred in production. Further, the system may standardize data collection for robust traceability and accountability. In some implementations, the system may continually refine recommended actions based on user acknowledgment of suggested actions taken on previous insights.

In some aspects, the system may implement a traceability tool that provides the above-mentioned functionality by generating a system data stream for an SDLC management platform that stitches together source data from multiple sources, training a machine learning model to generate progress information and execution risks for a feature change (or user story) on the SDLC management platform, generating a graphical user interface with information for each user story and corresponding progress tracking indicia based on output from the machine learning model, and generating an event-based view of prior actions for each user story and one or more recommended actions to address execution risks.

Conventional approaches to SDLC in large enterprises utilizing distributed software environments face significant challenges in achieving comprehensive traceability of software feature changes. This lack of visibility can lead to software delivery risks, impacting quality and accountability, and increasing the likelihood of production incidents that can result in financial, reputational, and regulatory damages. This issue is compounded by inconsistent data collection and reliance on manual processes, which hinder effective risk management and compliance efforts. In the event of production incidents, substantial efforts are required to gather event-based data, formulate an understanding of what led up to the incident, and manually derive insights into root causes and preventative actions.

Accordingly, developing a system that provides end-to-end traceability and risk management in a distributed software environment presented significant technological uncertainties. A significant area of technological uncertainty was developing a pipeline of machine learning models capable of accurately identifying anomalies and providing actionable recommendations. Training these models required extensive data collection and validation to ensure reliable prediction of issues and effective intervention suggestions. The inherent variability and complexity of software development processes meant the models needed to be highly adaptable, capable of learning from a diverse range of scenarios. Adaptive models, such as large language models, enhanced supervised learning models, small language models, agentic architecture, or other suitable models, were required to provide context-aware recommendations based on detected anomalies. Additionally, generating a user-friendly graphical interface that could visually present this information entailed significant challenges in data visualization and user experience design.

Moreover, the system was designed to execute recommended actions or a kill switch when appropriate. For instance, the adaptive model works in conjunction with machine learning models to determine if anomalies detected reach a severity necessitating immediate action. If a recommended action is generated, the system may automatically execute it to correct the trajectory of development activities. If no viable corrective action is identified, or if the anomaly poses a critical risk, the system can trigger a kill switch to halt all related activities and prevent further complications. This ensures proactive management and mitigation of risks before they escalate into significant issues.

To address these uncertainties, the inventors systematically evaluated multiple design alternatives. For instance, the inventors tested various machine learning algorithms, including supervised and unsupervised learning techniques, to identify the most effective models for predicting risks and generating recommendations. Additionally, they explored using LLMs and other suitable models to generate actionable insights based on historical and real-time data. Each alternative presented its own set of challenges and required iterative testing and refinement to achieve the desired accuracy and reliability.

In some aspects, the system may implement a traceability tool that leverages a mixed pipeline of machine learning models (e.g., classification models, etc.) and adaptive models (e.g., large language models, enhanced supervised learning models, small language models, agentic architecture, or other suitable models), including a first machine learning model to generate trend information for user stories and identify anomalies in the trend information, a second machine learning model to determine dynamic thresholds for the identified anomalies, and an adaptive model to generate recommended actions for an anomaly that satisfies its corresponding dynamic threshold.

In some aspects, the system may implement a traceability tool that leverages a mixed pipeline of machine learning models (e.g., classification models, etc.) and adaptive models (e.g., large language models, enhanced supervised learning models, small language models, agentic architecture, or other suitable models), including a first machine learning model to generate trend information for user stories and identify anomalies in the trend information, a second machine learning model to determine dynamic thresholds for the identified anomalies, and when an adaptive model fails to generate any recommended actions for an anomaly, executes a kill switch for the corresponding user story.

Overview

For brevity, the terms "user" and "subscriber" are used interchangeably, although one of skill will appreciate that certain features of the disclosed systems and techniques can be accessible to individuals or entities that are not registered with service providers. The term "release" refers to distribution, deployment, or other action to make available a system or feature set. A particular release can include one or more units of work ("projects") and/or a particular unit of work ("project") can be associated with one or more releases. Units of work can be performed according to requirements, which can be associated with performance metrics, such as requirements traceability (the ability to follow a requirement from a first particular point to another particular point). Groups of units of work within a project and/or a release can be implemented as a group, as a feature set, in a sprint, etc. Groups of requirements within a project and/or a release can be organized into item groups ("epics" or "user stories").

Example Analytics System(s)

FIG. 1 is a system diagram showing some of the components typically incorporated in at least some of the computer systems and other devices on which the disclosed system operates in accordance with some implementations of the present technology. To solve the technical problems described herein, the inventors have conceived and reduced to practice a computing system structured to facilitate management and presentation of data streams from various source systems. According to various embodiments, the system described herein includes machine learning models and/or other techniques to enable end-to-end traceability of software feature changes for various computing systems within an organization.

As shown, the environment 100 includes a QA management system 102, an SDLC management system 104, a change management system 106, a computing environment 108, an analytics system 110, and a subscriber device 112. As shown, the components are communicatively coupled via network 113. The QA management system 102 can be structured to manage data about requirements, test cases, approvals, accessibility features, and related system features (e.g., in relation to development items for applications 109). The SDLC management system 104 can be structured to manage data about project planning, deliverables, and/or resources and related system features (e.g., in relation to development items for applications 109). The change management system 106 can be structured to manage data about technology assets (e.g., applications 109, executables, code versions, deployment instances, and the like) and related system features. The computing environment 108 can be an internal or external computing environment that can include various applications 109. The analytics system 110 can be structured to perform the operations described herein, such as, for example, the operations described in relation to FIG. 2. Various user interfaces generated by the analytics system 110 can be presented to subscribers using one or more of subscriber devices 112.

In operation, the analytics system 110 can receive data streams from any of the QA management system 102, SDLC management system 104, change management system 106, computing environment 108, and/or subscriber device 112. For example, QA management system 102 can provide a data stream 102a, which can include test case data, such as user story data, epic data, requirement data, approver data, completion data and/or the like. For example, SDLC management system 104 can provide a data stream 104a, which can include project planning data, timeline data, deliverable data, resource data (e.g., people, assets), and/or the like. For example, the change management system 106 can provide a data stream 106*a*, which can include asset data, application data, executable data, deployment instance data, and/or the like. For example, computing environment 108 can provide data regarding operational state of various applications 109, which it can exchange with the change management system 106. For example, subscriber device 112 can be an administrator device used to provide various configuration settings for the analytics system 110. Various additional systems can be interfaced with the analytics system 110 to provide additional data, such as, for example, active directory data including user names, email addresses, titles, and/or the like.

The data streams can be received by the analytics system 110 in real-time or scheduled mode through a suitable channel, including application programming interface (API) calls, RSS feeds, REST interfaces, batch file uploads, SQL queries, and/or the like. The data items can be structured according to various formats, such as RSS, CSV, HTML, XML, Excel, SQL query data sets, and/or the like.

Based on the received data, the analytics system 110 can be structured to generate one or more system data streams 110*a*, which can consolidate, optimize, aggregate, de-aggregate, transform, tag and/or otherwise process various data items in the received data streams. For example, in some implementations, the test data 102*a* and SDLC data 104*a* can be linked in the system data stream based on a suitable cross-referencing identifier, such as a user story identifier, epic identifier, project identifier, and/or the like. As another example, the test data 102*a* can be linked, via the SDLC data 104*a*, to application data 106*a*, by first cross-referencing the test data 102*a* with the SDLC data 104*a* and then cross-referencing the SDLC data 104*a* with application data 106*a*. In some implementations, the analytics system 110 can parse out the inbound data streams according to one or more criteria, such as application area, task type, requirement type, functional unit, application, server, network segment (subnet where the affected application(s) 109 are deployed), and/or the like such that only the specified relevant data is included in the outbound data stream 110*a*. To that end, one or more parser executables can be deployed at various points, including before the inbound data streams reach the analytics system 110, at the analytics system 110, and/or after the inbound data streams are generated and bound to user interfaces to be displayed (e.g., via client-side parsers at the subscriber devices 112). In some implementations, the outbound data stream 110*a* can include any of markup language tags, flat files, relational data, interface messages, key-value pairs and/or the like. In some implementations, data from the outbound data stream 110*a* is stored in a database.

Method(s) of Operation of the Example Analytics System(s)

FIG. 2 is a flow diagram illustrating an example process 200 for a traceability tool that generates a system data stream for an SDLC management platform that stitches together source data from multiple sources; trains a machine learning model to generate progress information and execution risks for a feature change (or user story) on the SDLC management platform; based on output from the machine learning model, generates a graphical user interface with information for each user story and corresponding progress tracking indicia; and for each user story, generates an event-based view of prior actions and one or more recommended actions to address execution risks. For example, some or all operations of process 200 can be performed and/or controlled by the analytics system 110, either alone or in combination with other system(s). As a general overview, process 200 can include receiving inbound data streams, extracting SDLC and/or application data from the received inbound data streams, generating determinations regarding the affected applications or other items in computing environments, generating predictions regarding impact of activities codified in the test and/or SDLC data on the computing environments, based on the generated predictions, generating a system data stream that includes various indicia, and binding the system data stream to a limited set of displayable smart dials and/or smart bars indicative of system state and/or generated predictions.

Figure 4:
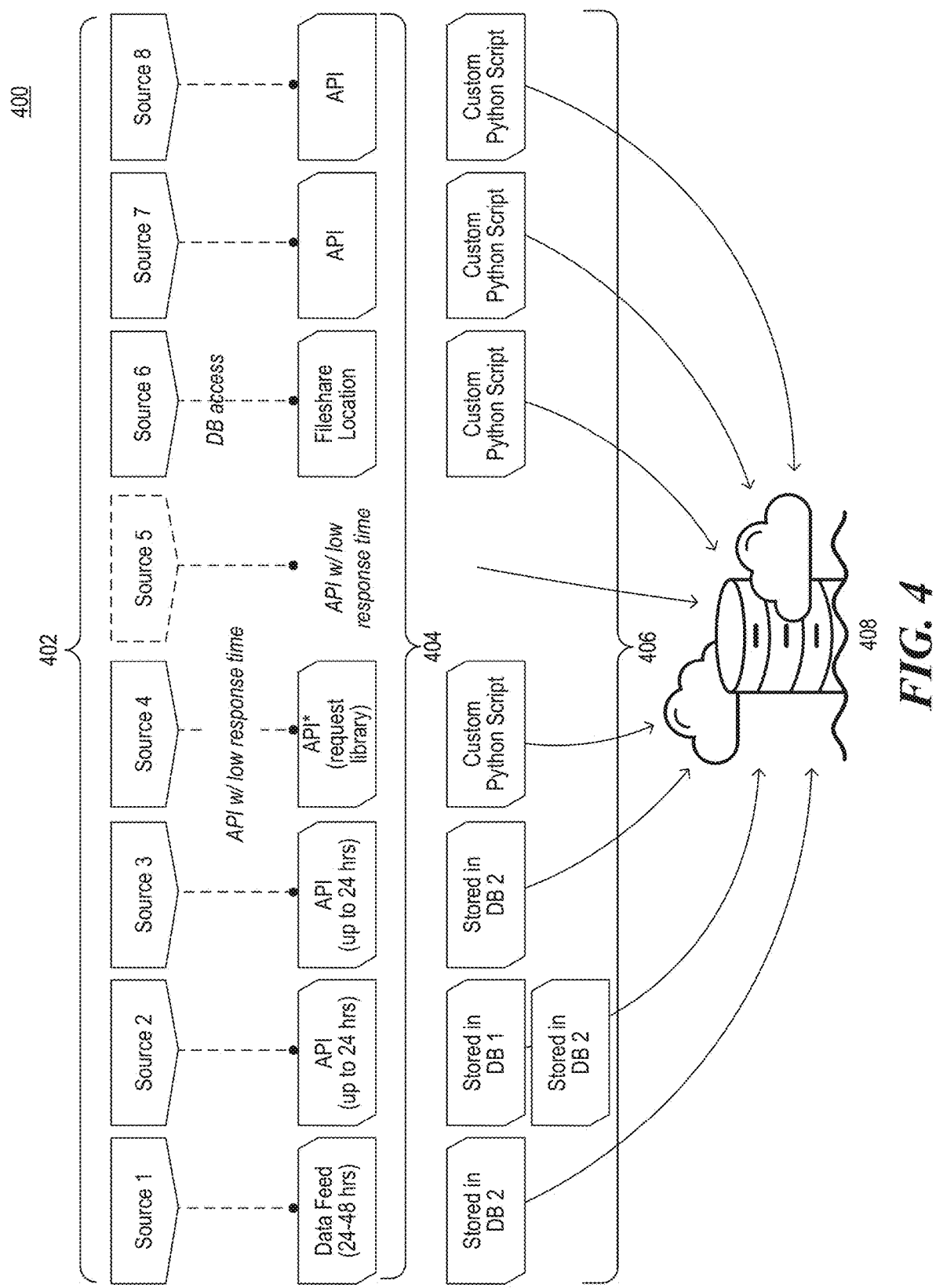
FIG. 4 is another block diagram illustrating example data flow for a software development lifecycle traceability tool in some implementations of the present technology.

In operation, at 202, the analytics system 110 generates a system data stream for a SDLC management platform that stitches together data from a plurality of computing systems. For example, for each computing system in the plurality of computing systems, the analytics system 110 may process a source data stream from the computing system to determine a datatype of data included in the source data stream. The source data stream may be associated with a plurality of user stories corresponding to the SDLC management platform. The analytics system 110 may, based on the determined datatype of the source data stream, process the source data stream to generate a transformed data stream for storage in a data repository. FIG. 4 shows an example of different source data streams and datatypes.

For example, the data can include a user story identifier, an epic identifier, a project identifier, a release identifier, an application identifier, or another identifier that, in whole or in part, can be cross-referenced to or otherwise used to determine relevant project data and application data. For example, the data can include a tag or another markup-language based item that includes the identifier or an item or items that can be used to determine an identifier.

Figure 15A:
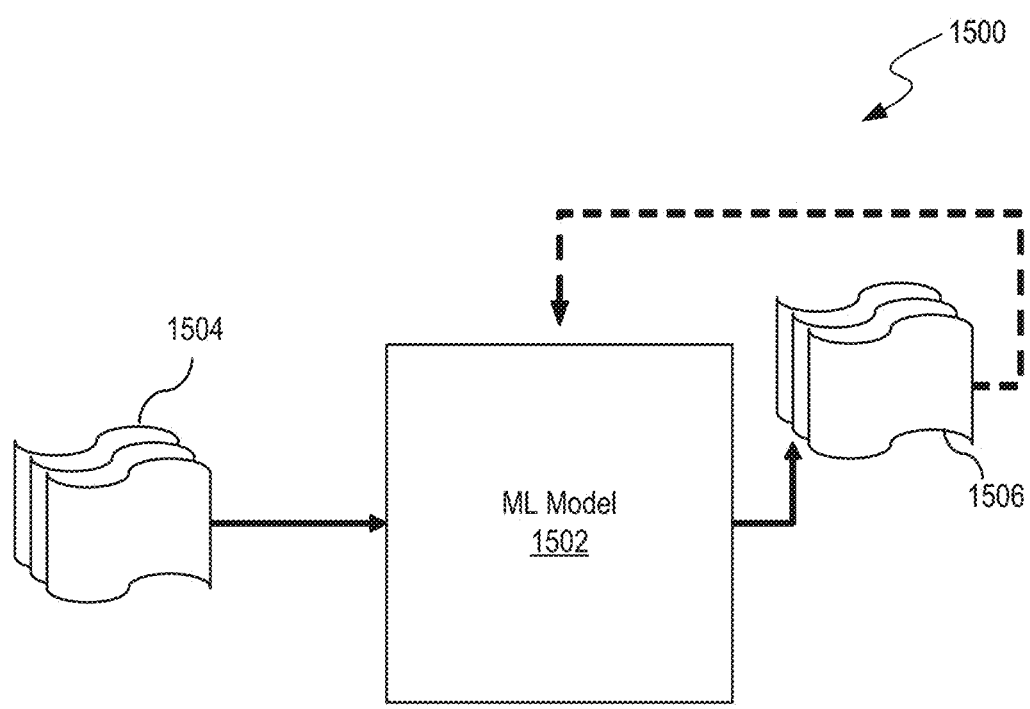
FIG. 15A is a block diagram illustrating an example machine learning model of a computing environment in which the disclosed system operates in some implementations of the present technology.

At 204, the analytics system 110 trains a machine learning model based on the system data stream to generate progress information and one or more execution risks for an input user story identifier. In some implementations, the data can be fed to a machine learning model trained to determine (e.g., based on data labels, data types, data content, etc.) identifier candidates and/or corresponding likelihood scores for which data can be linked to data in other source data streams. FIG. 15A shows an example machine learning model that may be used though the embodiments described herein are not so limited.

At 206, the analytics system 110 generates a query to the machine learning model for each user story identifier of the plurality of user stories corresponding to the SDLC management platform.

At 208, the analytics system 110, based on output from the machine learning model, generates a graphical user interface displayable on a client device, wherein the graphical user interface includes information for each user story of the plurality of user stories and corresponding progress tracking indicia.

Figure 8:
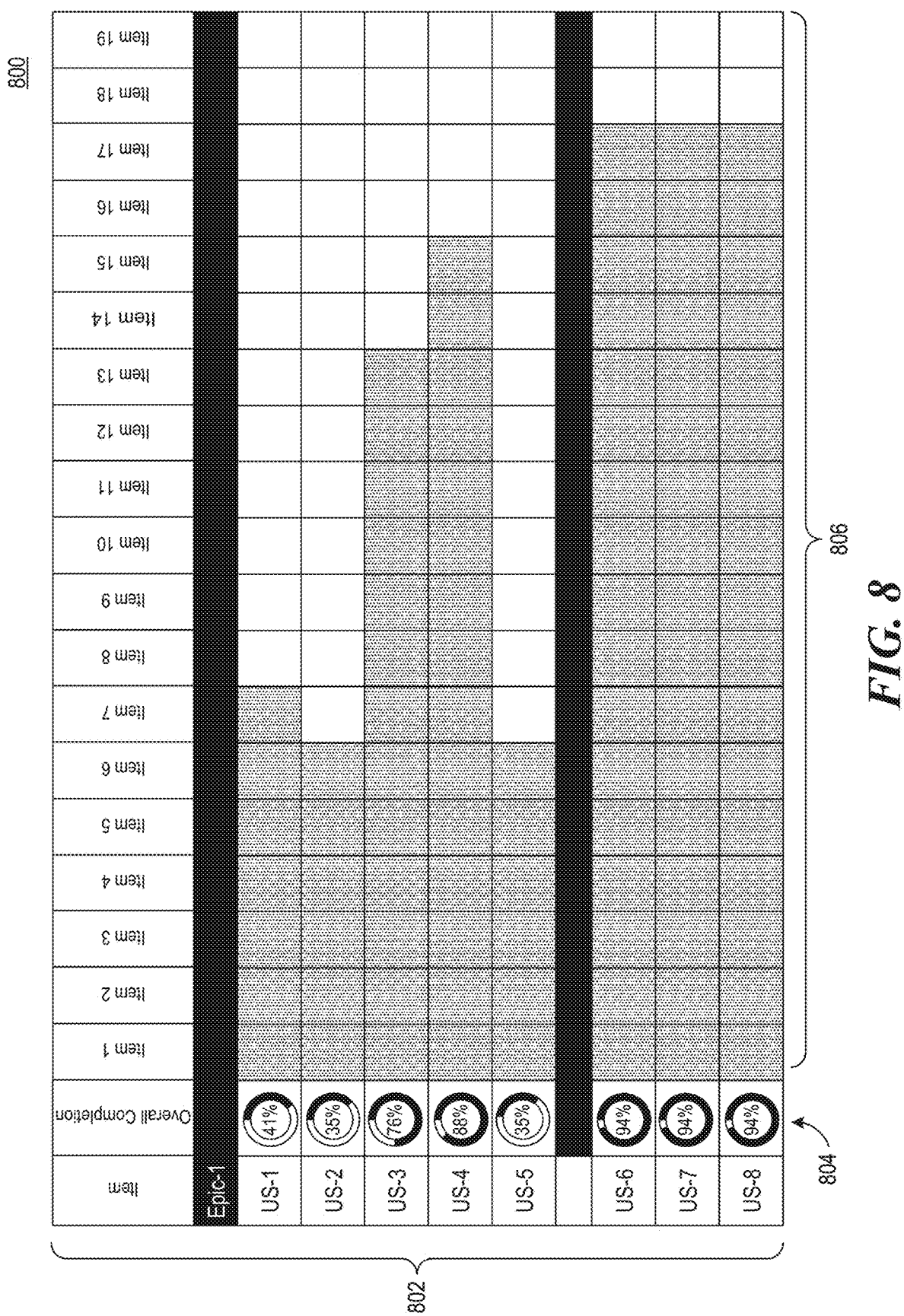
FIG. 8 is a GUI diagram illustrating yet another example display screen for a software development lifecycle traceability tool in some implementations of the present technology.

At 210, the analytics system 110 binds, to two or more controls on the graphical user interface, the progress information for the user story for each user story included in the graphical user interface. The two or more controls may include a first smart dial structured to provide, via a first progress tracker, a first visual indicium related to a completion of the user story and a second smart bar structured to provide, via a second progress tracker, a second visual indicium related to a current stage of engineering involvement for the user story. FIG. 8 shows an example smart dial and smart bar though the embodiments described herein are not so limited.

In some implementations, the system may automatically determine a completion percentage value for the first progress tracker of the first smart dial based on one or more items included in the system data stream. In some implementations, the system may evaluate the completion percentage value against a threshold and, based on the evaluation of the completion percentage value, generate a customized electronic notification.

In some implementations, the system may retrieve, from a data storage medium, an email message template. The system may extract, from the system data stream, at least one item. The system may cause a communications engine to determine a recipient based on the at least one item; generate, based on the email message template and the at least one item, an electronic notification for an entity; and transmit the electronic notification to the determined recipient.

At 212, the analytics system 110, based on the one or more execution risks for the user story, generates an event-based view of prior actions and one or more recommended actions to address the one or more execution risks for each user story included in the graphical user interface.

In some implementations, for a first user story, the analytics system 110 may determine that a period spent in a current stage of engineering involvement for the first user story exceeds a threshold period for the current stage. The system may generate, for display in the graphical user interface, a message indicating an intervening action may be required to progress the first user story to a next stage of engineering involvement. In some implementations, the system may determine a source for a blocking signal for the current stage of engineering involvement for the user story. The system may, based on the source for the blocking signal, generate a potential intervening action to progress the first user story to the next stage of engineering involvement. In some implementations, the system may generate, for display in the graphical user interface, a second message indicating the potential intervening action to progress the first user story to the next stage of engineering involvement. In some implementations, the system may, without user intervention, execute the potential intervening action to progress the first user story to the next stage of engineering involvement.

In some implementations, items in the graphical user interface may include alerts (e.g., based on templates associated with the generated data streams), notifications, destination paths to output data files that include items in the data stream, user interface controls and/or the like. For example, the analytics system 110 may determine (e.g., based on change management data) approver information and email addresses and generate notifications using this information. For example, the analytics system 110 may use the generated data stream to populate and/or configure user interface controls, such as smart dials. For example, the analytics system 110 may provide the generated data stream as an input to machine learning models or other predictive models for further analytics. Further analytics can include system impact analytics, system downtime analytics, developer efficiency analytics, query engines that underlie natural language processors (e.g., chat bots structured to operate on test case, SDLC control, and/or application data), and/or the like.

In some implementations, the system may generate various other predictions related to estimated impact on the applications, such as predicted downtime window, predicted downtime duration, predicted throughput/processing capacity (e.g., for interfaces), predicted CPU usage, predicted memory usage, predicted requests per minute, predicted bytes per request, predicted latency, predicted upload speed, predicted download speed, average response time, user satisfaction score, and/or the like. To generate the predictions, the system can use historical data regarding similar or related metrics along with the cross-referenced data from the test case and SDLC data streams.

In some implementations, a single system data stream includes data for the entire computing environment. In some implementations, multiple system data streams are dynamically constructed according to data stream configuration parameters. The data stream configuration parameters can, for example, specify smart dial display options (e.g., determining which smart dials/indicia to display), the type of data attributes to include in a particular generated system data stream (e.g., add or remove certain tags, such as owner/approver contact information, affected applications, system accessibility schemas, requirements type, defect severity), and so forth.

Feature(s) of the Example Analytics System(s)

According to various embodiments, the GUIs described herein enable end-to-end traceability of software feature changes for various computing systems within an organization. The GUIs can be implemented as one or more circuits, controls, binaries, graphics and/or other components that comprise a user interface, and can include programmable visual components (e.g., dials, sliders, grids, parsing controls, labels, checkboxes, option buttons and/or the like). In order to overcome the technical problems associated with small computer screens, the visual components can be bound to custom data streams. The custom data streams can be generated by the analytics system 110 based on data from several source systems. This architecture enables presentation of system data and insights via a limited number of configurable controls visible in a small number (e.g., one, two) of groups or screens at a time.

As a general overview, the GUIs can include resizable panels that can show various global items applicable to more than one individual view. Global items can include generated values determined using system data streams bound to individual controls shown on the GUIs. Global items can include, for example, a menu area, which can be populated with dynamically generated menu options relevant to the displayed individual controls. Global items can include, for example, header area, which can be populated dynamically (e.g., with values determined or calculated at run-time as the particular GUI is initialized, loaded, and/or refreshed) based on metadata generated for the system data streams, such as data timestamp, release information, number of completed projects according to a particular control variable, number of total projects, etc.

Figure 3:
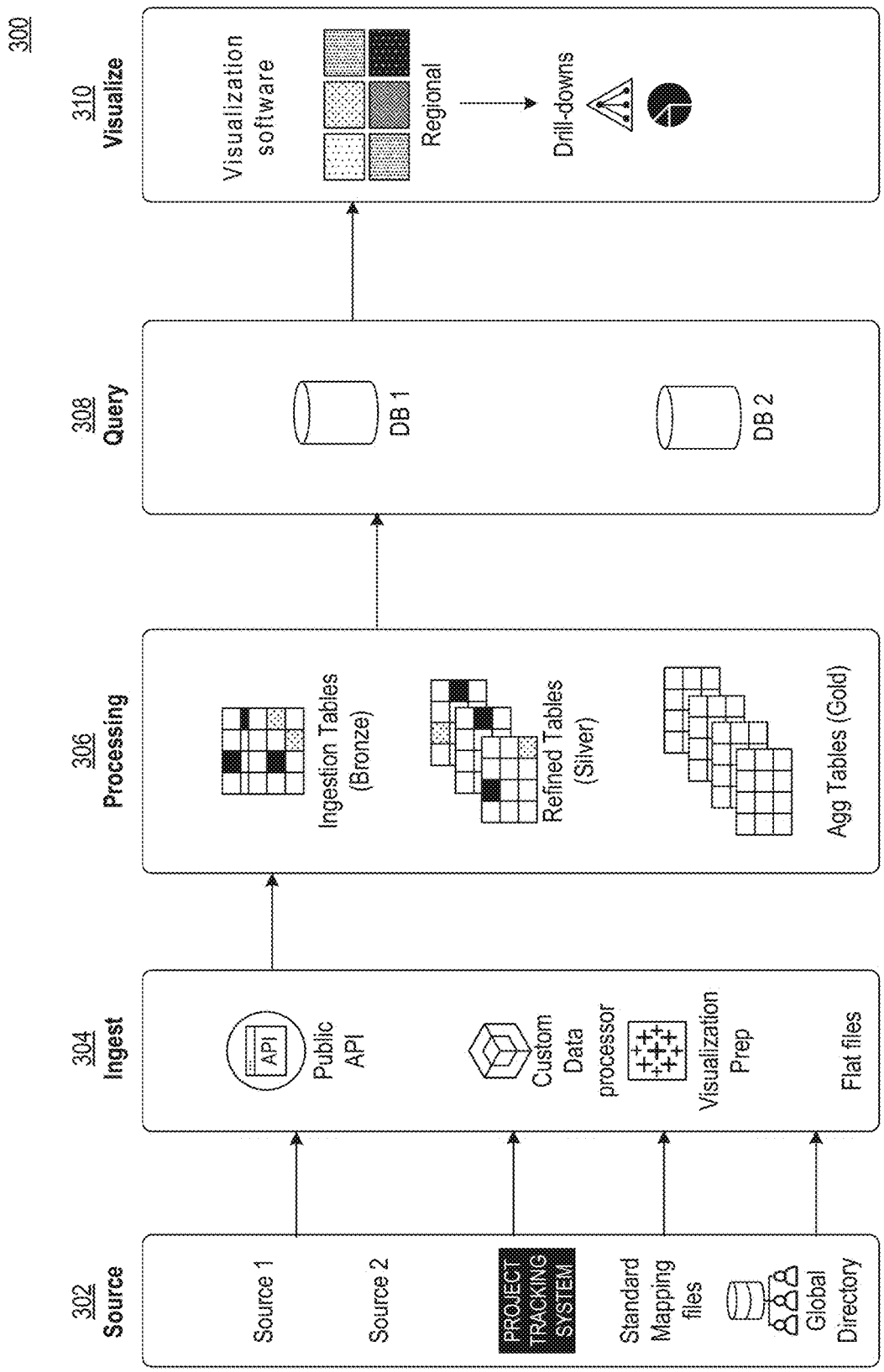
FIG. 3 is a block diagram illustrating example data flow for a software development lifecycle traceability tool in some implementations of the present technology.

FIG. 3 is a block diagram illustrating example data flow 300 for a software development lifecycle traceability tool in some implementations of the present technology. In some embodiments, the example data flow 300 may be the result of executing process 200 described with respect to FIG. 2. The traceability tool receives source data from multiple sources in source stage 302, such as JIRA, SNOW, etc. At ingest stage 304, the traceability tool generates a system data stream for an SDLC management platform that stitches together source data from multiple sources. At processing stage 306, the traceability tool trains a machine learning model to generate progress information and execution risks for a feature change (or user story) on the SDLC management platform. At query stage 308, the traceability tool queries the machine learning model for each user story identifier of a plurality of user stories corresponding to the SDLC management platform. At visualize stage 310, based on output from the machine learning model, the traceability tool generates a graphical user interface with information for each user story and corresponding progress tracking indicia and, for each user story, generates an event-based view of prior actions and one or more recommended actions to address execution risks.

FIG. 4 is another block diagram illustrating example data flow 400 for a software development lifecycle traceability tool in some implementations of the present technology. As shown in FIG. 3, source data can be retrieved from multiple sources. Such sources 402 may have different means 404, 406 of accessing data, including application programming interfaces, fileshare locations, etc. The retrieved data may be stored in different storage 404 before being ingested and subsequently combined into data repository 408.

Figure 5:
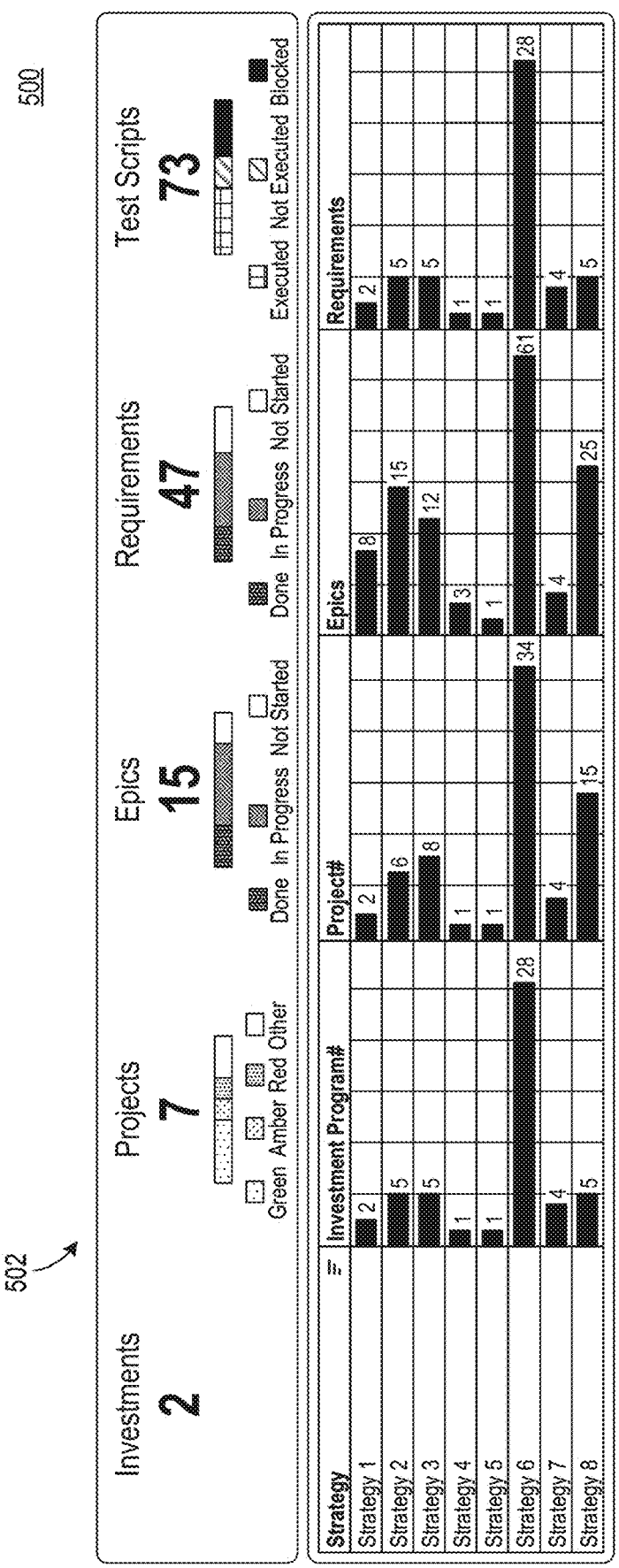
FIG. 5 is a GUI diagram illustrating an example display screen for a software development lifecycle traceability tool in some implementations of the present technology.

FIG. 5 is a GUI diagram illustrating an example display screen 500 for a software development lifecycle traceability tool in some implementations of the present technology. In some implementations, the landing screens (502, 504) are summary screens. The summary screens can be populated with configurable summary controls that illustrate individual system management and/or performance parameters determined based on the generated system data stream(s). According to various implementations, the controls can include graphical and/or text elements and can show progress and/or completion status in absolute or relative numerical terms (e.g., a count, a percentage of total).

Figure 6:
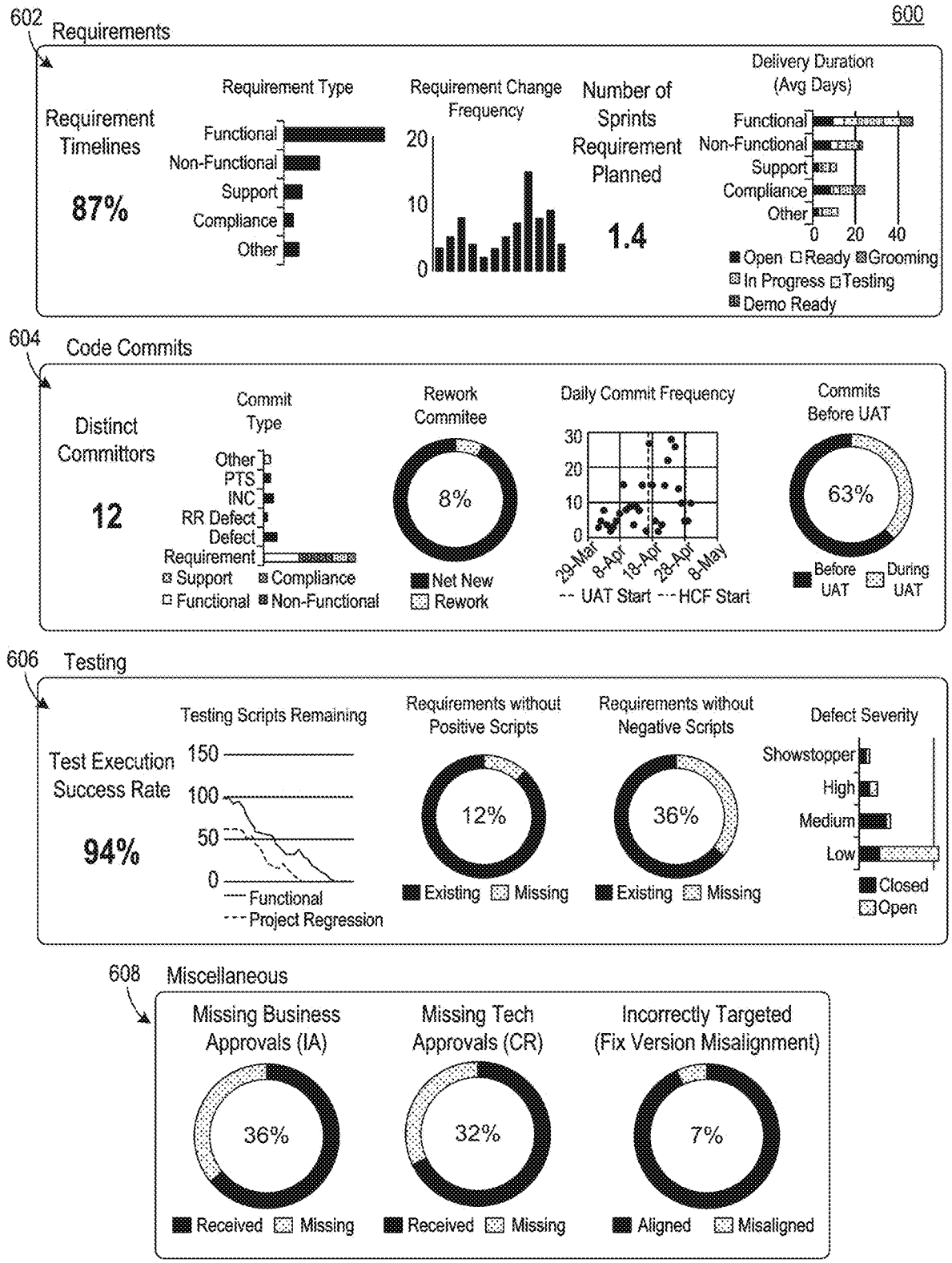
FIG. 6 is a GUI diagram illustrating another example display screen for a software development lifecycle traceability tool in some implementations of the present technology.

FIG. 6 is a GUI diagram illustrating an example display screen 600 for a software development lifecycle traceability tool in some implementations of the present technology. In some implementations, the landing screens (602, 604, 606, 608) are summary screens. The summary screens can be populated with configurable summary controls that illustrate individual system management and/or performance parameters determined based on the generated system data stream(s). In some implementations, the controls can be implemented as one or more smart dials. The smart dials can include one or more graphical elements. The graphical elements can be parametrized and programmatically configurable based on system data stream data, system data stream metadata, and/or dynamically determined/calculated values using the system data stream data and/or supplemental data related to one or more items in the system data stream. For example, a particular smart dial can include a graphical element (e.g., an arc, a progress bar, a circle, and/or the like) whose color, fill, opacity, and/or another suitable property affecting the display of the element is set dynamically based on the above parameters. In some implementations, detecting a user interaction with a particular smart dial causes the system to display a corresponding user interface that provides further information from the system data stream. In some implementations, detecting a user interaction with an item in further information causes the system to display a corresponding user interface that provides a log-in page to the corresponding source system (based, e.g., on a tag in the system data stream that identifies the source system(s) for a particular data item).

Figure 7:
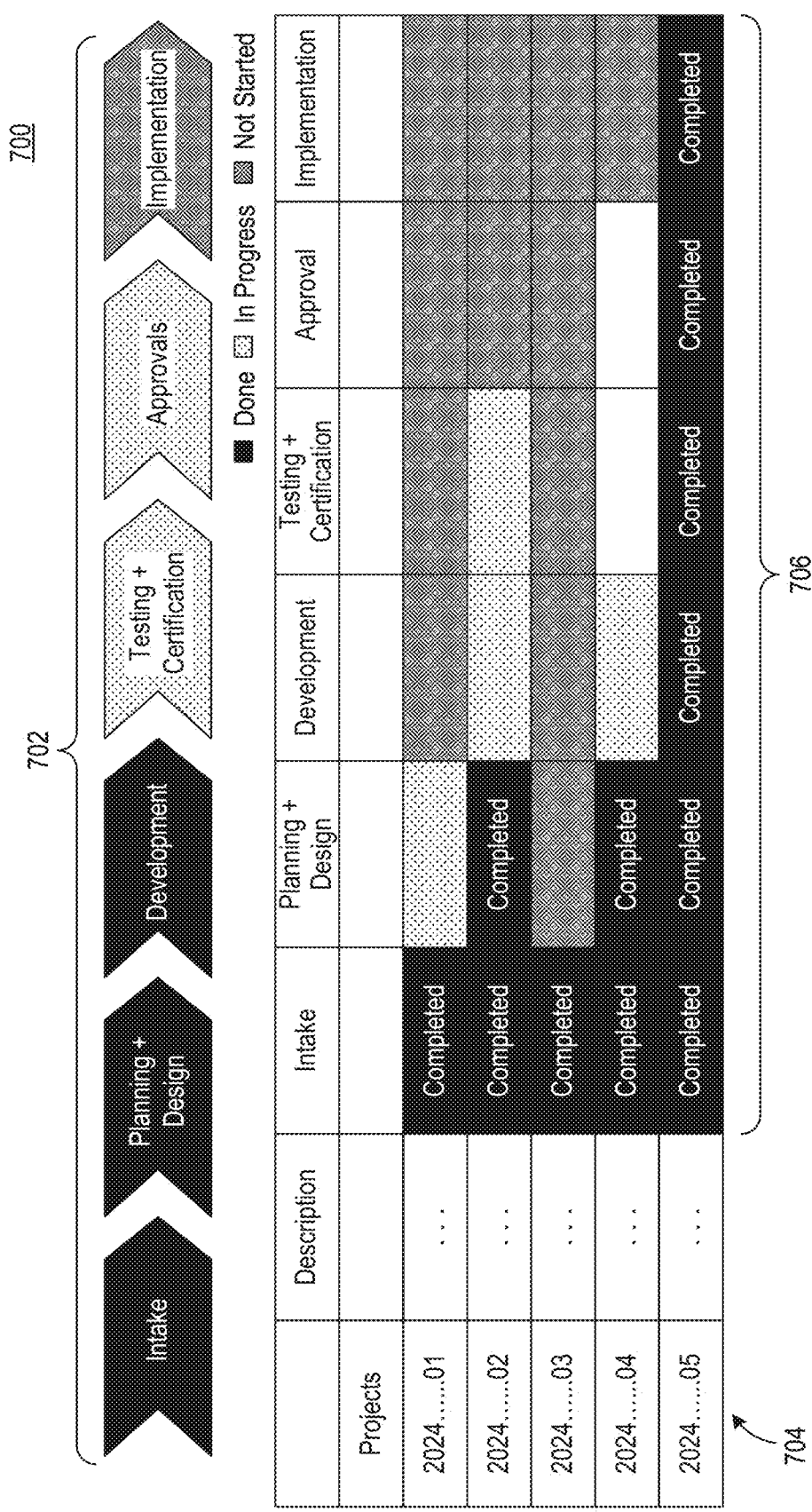
FIG. 7 is a GUI diagram illustrating yet another example display screen for a software development lifecycle traceability tool in some implementations of the present technology.

FIG. 7 is a GUI diagram illustrating an example display screen 700 for a software development lifecycle traceability tool in some implementations of the present technology. In some implementations, GUI diagrams (702, 704, 706) illustrate example end-to-end traceability of software feature changes by project of the disclosed system in some implementations of the present technology. As a general overview, the GUI diagrams illustrate implementations where the project-level items from the generated system data stream are used to determine the state of project execution relative to system requirements. Ordinarily, such single-screen insights are not available via conventional test, project tracking, application tracking, change management, and other systems. As shown, in some implementations, analytics can be performed for more than one project and/or application at the same time, and overall progress statistics for the selected project and/or application set can be determined and displayed.

FIG. 8 is a GUI diagram illustrating an example display screen 800 for a software development lifecycle traceability tool in some implementations of the present technology. In some implementations, to optimize system performance, end-to-end traceability of software feature changes (802, 804, 806) can be built into (e.g., at the computational logic layer) the set of operations that generates the system data stream and/or can be performed after the system data stream is generated and before various elements of the system data stream are bound to the GUI controls. For example, when the system data stream is generated, project data can be tagged and/or linked based on a determined common identifier, such as a project identifier and/or a user story identifier. For example, when the system data stream is generated, in order to increase the speed of data retrieval when the GUI is displayed, affected applications can be determined and the data stream can be tagged with the corresponding affected application information. For example, because the number of items that represent completed executed test cases may change dynamically, the executed case counts can be determined dynamically as the GUI is provided to the subscriber. As a general overview, the GUI diagrams illustrate implementations where the project-level items from the generated system data stream are used to generate end-to-end insights into the system development lifecycle data. The GUI diagrams illustrate implementations where the project-level items from the generated system data stream are used to determine and/or predict the impact of project items (e.g., a release of a feature) on connected applications. For example, determining and/or predicting the impact can include determining and/or generating a prediction regarding whether a particular connected application works as intended after the project item is released. Ordinarily, such single-screen insights are not available via conventional test, project tracking, application tracking, change management, and other systems. As shown, in some implementations, analytics can be performed for more than one project and/or application at the same time, and overall progress statistics for the selected project and/or application set can be determined and displayed. For example, as shown in FIG. 8, user stories and their associated project completion status can be presented by user story. In some implementations, project data can be prioritized or otherwise sequenced, altered, or enhanced by applying to the project data a set of parsing criteria and/or supplemental project information, such as priority information, received from a project tracking system.

Figure 9:
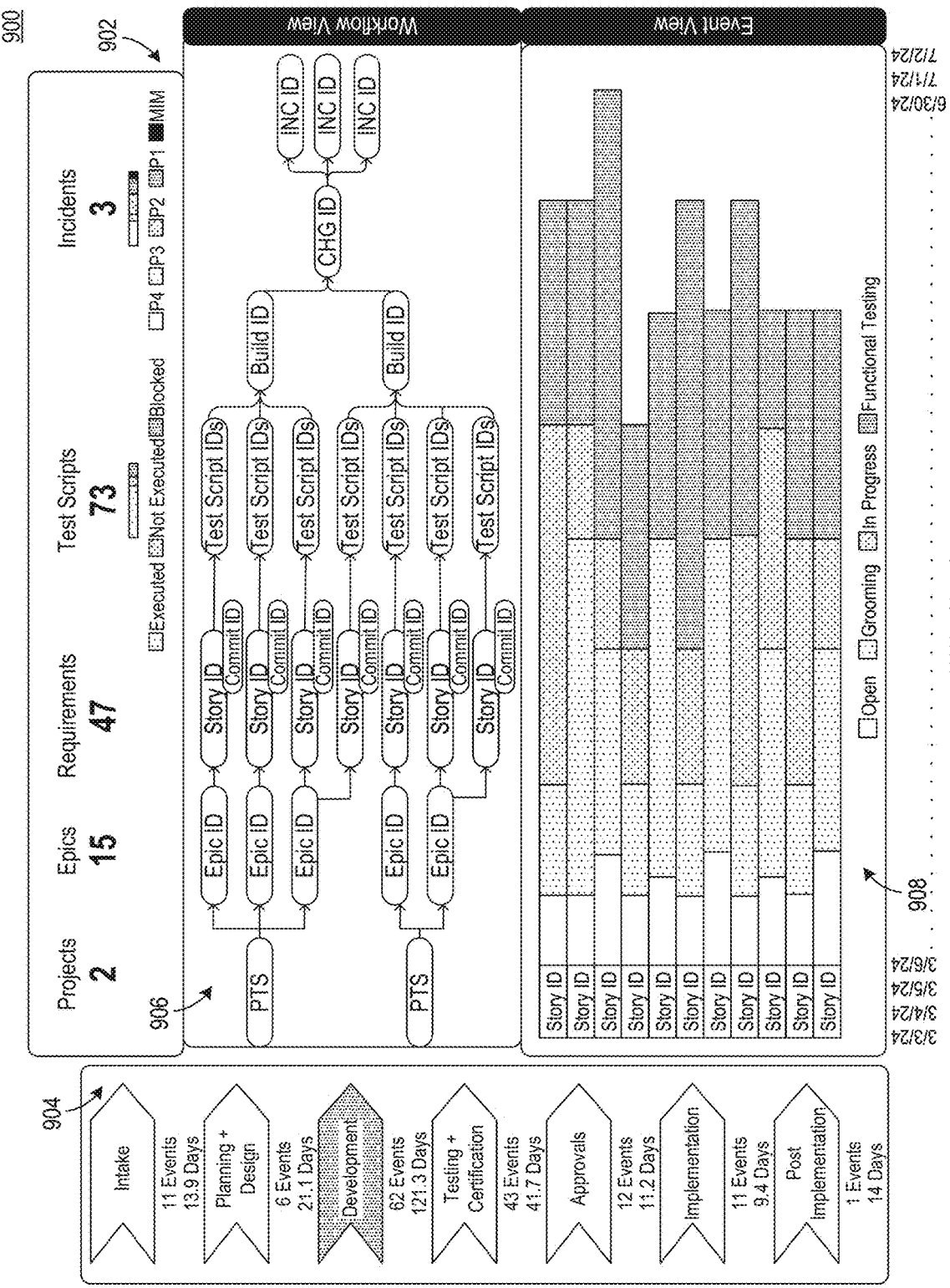
FIG. 9 is a GUI diagram illustrating yet another example display screen for a software development lifecycle traceability tool in some implementations of the present technology.

FIG. 9 is a GUI diagram illustrating an example display screen 900 for a software development lifecycle traceability tool in some implementations of the present technology. In some implementations, to optimize system performance, post mortem analytics (902, 904, 906, 908) can be built into (e.g., at the computational logic layer) the set of operations that generates the system data stream and/or can be performed after the system data stream is generated and before various elements of the system data stream are bound to the GUI controls. For example, when the system data stream is generated, project data can be tagged and/or linked based on a determined common identifier, such as a project identifier and/or a user story identifier. For example, when the system data stream is generated, in order to increase the speed of data retrieval when the GUI is displayed, affected applications can be determined and the data stream can be tagged with the corresponding affected application information. For example, because the number of items that represent completed project regression test cases may change dynamically, the executed case counts can be determined dynamically as the GUI is provided to the subscriber. As a general overview, the GUI diagrams illustrate implementations where the project-level items from the generated system data stream are used to determine and/or predict the extent to which identified system defects have been resolved. For example, determining and/or predicting the system defects can include determining and/or generating a prediction regarding an extent (e.g., percentage) to which deviations from requirements (e.g., identified based on the test data) for a particular feature have been resolved. Ordinarily, such single-screen insights are not available via conventional test, project tracking, application tracking, change management, and other systems. As shown, in some implementations, analytics can be performed for more than one project and/or application at the same time, and overall system control statistics for the selected project and/or application set can be determined and displayed.

Further Embodiments of the Example Analytics System(s)

Conventional approaches to SDLC in large enterprises utilizing distributed software environments face significant challenges in achieving comprehensive traceability of software feature changes. This lack of visibility can lead to software delivery risks, impacting quality and accountability, and increasing the likelihood of production incidents that can result in financial, reputational, and regulatory damages. This issue is compounded by inconsistent data collection and reliance on manual processes, which hinder effective risk management and compliance efforts. In the event of production incidents, substantial efforts are required to gather event-based data, formulate an understanding of what led up to the incident, and manually derive insights into root causes and preventative actions.

Accordingly, developing a system that provides end-to-end traceability and risk management in a distributed software environment presented significant technological uncertainties. A significant area of technological uncertainty was developing a pipeline of machine learning models capable of accurately identifying anomalies and providing actionable recommendations. Training these models required extensive data collection and validation to ensure reliable prediction of issues and effective intervention suggestions. The inherent variability and complexity of software development processes meant the models needed to be highly adaptable, capable of learning from a diverse range of scenarios. Adaptive models, such as large language models, enhanced supervised learning models, small language models, agentic architecture, or other suitable models, were required to provide context-aware recommendations based on detected anomalies. Additionally, generating a user-friendly graphical interface that could visually present this information entailed significant challenges in data visualization and user experience design.

Moreover, the system was designed to execute recommended actions or a kill switch when appropriate. For instance, the adaptive model works in conjunction with machine learning models to determine if anomalies detected reach a severity necessitating immediate action. If a recommended action is generated, the system may automatically execute it to correct the trajectory of development activities.

If no viable corrective action is identified, or if the anomaly poses a critical risk, the system can trigger a kill switch to halt all related activities and prevent further complications. This ensures proactive management and mitigation of risks before they escalate into significant issues.

To address these uncertainties, the inventors systematically evaluated multiple design alternatives. For instance, the inventors tested various machine learning algorithms, including supervised and unsupervised learning techniques, to identify the most effective models for predicting risks and generating recommendations. Additionally, they explored using LLMs and other suitable models to generate actionable insights based on historical and real-time data. Each alternative presented its own set of challenges and required iterative testing and refinement to achieve the desired accuracy and reliability.

In some aspects, the systems and methods described herein provide for a traceability tool is configured to leverage a combination of machine learning models (e.g., classification models) and an adaptive model (e.g., a large language model, an enhanced supervised learning model, a small language model, an agentic architecture, or another suitable model) to determine trend information for a user story, identify any anomalies, and provide recommended actions to address the anomalies or execute a kill switch if appropriate. For example, a classification model might be trained on historical data to identify patterns and trends in user story completion rates, defect occurrences, or code stability. The adaptive model can analyze the identified anomalies in the trend information and suggest corrective actions. For instance, if the classification model detects an anomaly indicating a sudden spike in defect rates, the adaptive model might recommend specific code reviews, additional testing, or even changes in the development process to mitigate the issue. Moreover, the system is equipped with a kill switch mechanism that can be triggered based on the severity of the anomalies. For example, if the adaptive model determines that the identified anomalies pose a significant risk to the project's stability, it can execute the kill switch to halt further development activities until the issues are resolved. This proactive approach helps prevent larger problems and ensures the overall quality and stability of the software.

In some implementations, the traceability tool may include various technical components such as an input monitoring module to continuously track data streams, an anomaly detection engine to identify deviations from expected trends, and a feedback and logging system to capture and learn from past issues. This comprehensive approach enables the traceability tool to offer data-driven, context-aware recommendations and automate critical decisions, thus improving the efficiency and reliability of software development processes.

In some implementations, the system organizes data in the repository into distinct categories corresponding to bronze (e.g., raw data including multiple tables based on source, with metadata for tracing and auditability), silver (e.g., processed or transformed data), and gold (e.g., generated insights). The system may leverage models specifically tuned to provide insights tailored to these categories. For instance, classification models such as decision trees or support vector machines analyze bronze data to detect patterns and transform it into silver data. Adaptive models, like large language models, enhanced supervised learning models, small language models, agentic architecture, or other suitable models, may then be employed to derive actionable insights from gold data. The system may incorporate an anomaly detection implementation to identify discrepancies between sources of data. For example, while the system might detect discrepancies between source data sets and their processed counterparts, an anomaly detection model could identify that, although discrepancies are currently within compliance, the trend is moving in an unfavorable direction. Such detections may be crucial for proactive risk management. In action, the classification model might flag a subtle but consistent increase in code defects from one sprint to the next. The adaptive model would then analyze this trend and recommend specific corrective measures, such as increased code reviews or additional testing protocols. In more critical cases, the system could execute a kill switch to halt deployment activities immediately, preventing potential large-scale production issues. This multi-tier approach ensures the traceability tool not only monitors and detects issues but also recommends and, if necessary, implements solutions to maintain software development integrity.

In some implementations, the system may implement advanced data visualization techniques, statistical process control (SPC), distance-based methods (e.g., Euclidean distance), and regression analysis for identifying anomalies in the data. Trend analysis methods such as linear regression and seasonal decomposition can be employed alongside machine learning-based techniques like decision trees, using Python libraries and data visualization tools such as Tableau and Power BI. For instance, trend analysis with machine learning models can analyze historical data to detect shifts in metric trajectories that may signal emerging issues. Should the system detect an upward trend in defect rates through linear regression, this could prompt a detailed review of recent code changes. The system can implement AI-based dynamic thresholds that adjust in response to data trends. For example, unlike static thresholds, dynamic thresholds adapt in real-time based on evolving data patterns, enhancing the system's ability to promptly flag unusual activities or deviations. Additionally, the system can carry out correlation regression analysis to determine the strength and nature of relationships between various metrics and related variables, thereby improving the detection of outliers or anomalies. Predictive insights can be derived using adaptive models such as large language models, enhanced supervised learning models, small language models, agentic architecture, or other suitable models. These insights help forecast potential changes based on historical data patterns. For instance, an LLM might analyze past sprint data to predict potential bottlenecks in upcoming development cycles, offering contextually relevant recommendations for resource reallocation or process adjustments. These AI-driven enhancements enable the system to provide data-driven and context-aware recommendations that inform long-term strategic planning and operational adjustments, ultimately contributing to more robust and efficient software development lifecycle management.

In some implementations, the system may include core components such as an input monitoring module, an anomaly detection engine, a custom large language model (LLM) trained auto-correction module, and a feedback and logging system (e.g., an issue logger to capture the flow in a backend database for the system to learn and improve in future scenarios). The tech stack may encompass Python, custom fine-tuned LLM, SciKit-learn, Kafka, Tableau, and a custom web application using ReactJS, among other suitable tools. The system may also feature an orchestration engine designed to navigate through the software stack, identify the source of a blocking signal, and automatically remediate the issue. For example, the system may execute a kill switch implementation where a single detected issue might be indicative of broader systemic problems that need to be preempted. In another scenario, the system could identify user-experience improvements, such as optimizing workflow processes or enhancing user story management. Adaptive models may be employed to continuously monitor operational data, identifying when metrics are within norms but signaling potential underlying issues before they manifest as significant problems. For instance, the system could alert users to gradually increasing error rates or performance degradation trends, providing context-specific recommendations based on historical data. Additionally, the system can implement AI-based dynamic thresholds that adapt based on ongoing trend analysis, ensuring real-time responsiveness to emerging anomalies. The overall architecture supports a robust feedback loop, allowing the system to refine its algorithms and improve over time. This comprehensive setup ensures proactive, data-driven decision-making, enhancing the efficiency and reliability of software development lifecycle management.

In some implementations, the system automatically corrects detected issues and continue the prescribed course of execution. The system can implement alerts based on identified trends and predefined thresholds that, once breached, will trigger a kill switch to prevent larger issues. For example, execution is halted if the system determines that the traceability of code is not adequately established during code reviews. The system can leverage adaptive models to generate recommendations and insights based on observed trends. Predictive models can also be used to forecast the future stability of changes, based on historical data showcasing seasonal patterns, trends, and anomalies. The system may assist in implementing granular controls for auto-healing mechanisms, such as updating user stories during implementation approval, modifying test scripts in test exit reports, matching code builds with build-IDs in change records, and automatically removing any unapproved builds to ensure continued execution. Further, the system can implement additional checks to identify unstable code or requirements, suggesting enhancements to user stories based on customer context. For instance, it could recommend refining user stories to better reflect customer needs, like enabling auto-payments for users in a banking application. The system continuously captures details of issues and their corrections, training its models for future scenarios to improve predictive and corrective capabilities. By integrating these models into existing workflows and systems via APIs, the system ensures seamless detection, correction, and execution, enhancing the overall efficiency and reliability of the software development lifecycle.

In some implementations, the system may leverage both machine learning models and adaptive models to produce meta insights based on a combination of current insights. For example, the system could detect that a piece of code which has been modified numerous times in a short period is likely to be unstable. This can be achieved through feature combination methods that take into account existing trends and anomalies identified by the models. The system can operate in a fully automated fashion or incorporate a human-in-the-loop setup for continuous feedback and improvement. The system may employ a combination of machine learning models, such as classification models, and adaptive models, including enhanced supervised learning models, small language models, agentic architecture, or other suitable models. Generative techniques may be used to produce new insights about anomalies and recommendations, while predictive techniques, such as K-nearest neighbor and neural networks, forecast the outcomes of software releases, deployments, and infrastructure changes. For instance, the system could predict potential stability issues in a new software release based on historical patterns of similar releases. These models may be seamlessly integrated into existing workflow management tools like JIRA, PTS (work management), SNOW (incident management), and GitHub (code management), thereby automating several manual touchpoints. This integration may ensure that anomalies and necessary corrective actions are promptly detected and implemented, maintaining the integrity and smooth operation of the software development lifecycle. As a part of the workflow, the system may implement AI-based dynamic thresholds that continuously adapt based on trend analysis, enabling real-time responsiveness to emerging issues. By leveraging adaptive models, the system can offer data-driven, context-aware recommendations that inform long-term planning and strategic decisions, thus enhancing the overall efficiency and reliability of the software development process.

Figure 10:
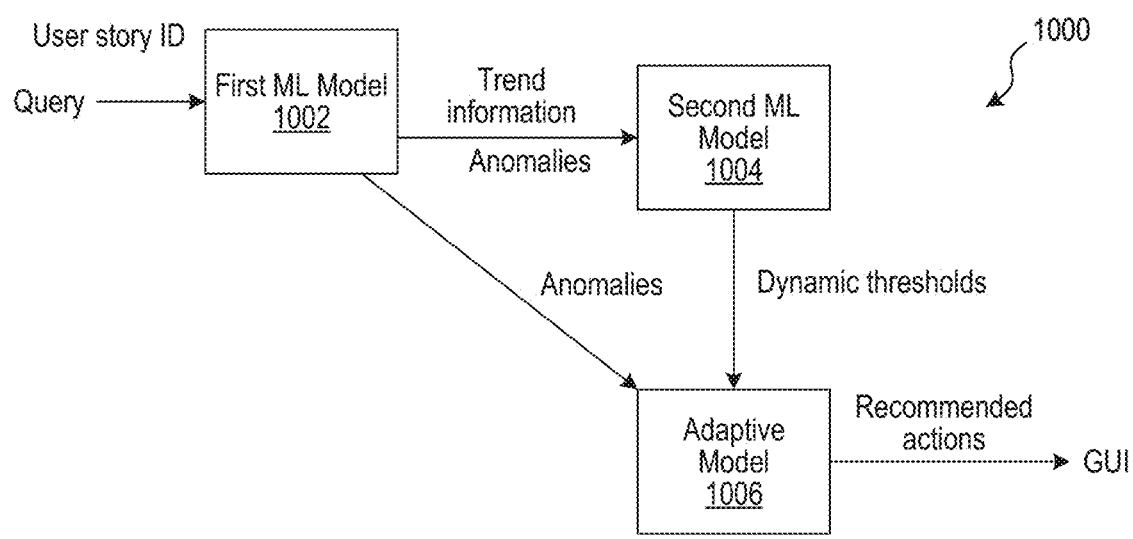
FIG. 10 is yet another block diagram illustrating example data flow for a software development lifecycle traceability tool in some implementations of the present technology.

FIG. 10 is a block diagram 1000 illustrating example data flow for a traceability tool that leverages a combination of machine learning models (e.g., classification models) and an adaptive model (e.g., a large language model, an enhanced supervised learning model, a small language model, an agentic architecture, or another suitable model) to determine trend information for a user story, identify any anomalies, and provide recommended actions to address the anomalies. The system, e.g., analytics system 110 or another suitable system, may receive a query including a user story identifier for input to first machine learning model 1002. First machine learning model 1002 may be trained based on past system data streams to generate trend information for one or more metrics and identify one or more anomalies in the trend information for an input user story identifier. FIG. 15A shows an example machine learning model that may be used though the embodiments described herein are not so limited. The output of first machine learning model 1002 may include (i) trend information for one or more metrics and (ii) one or more anomalies in the trend information for the user story identifier. The system may generate a graphical user interface configured to be displayed at a client device. The graphical user interface may include information for each user story and corresponding progress tracking indicia.

The output from first machine learning model 1002 may be provided as input to second machine learning model 1004. Second machine learning model 1004 may be trained based on past trend information to generate one or more dynamic thresholds for the one or more anomalies in the trend information for the input user story identifier. FIG. 15A shows an example machine learning model that may be used though the embodiments described herein are not so limited. The output of second machine learning model 1004 may include one or more dynamic thresholds for the one or more anomalies in the trend information for a corresponding user story identifier. The system may determine whether at least one anomaly satisfies a corresponding dynamic threshold.

Figure 15B:
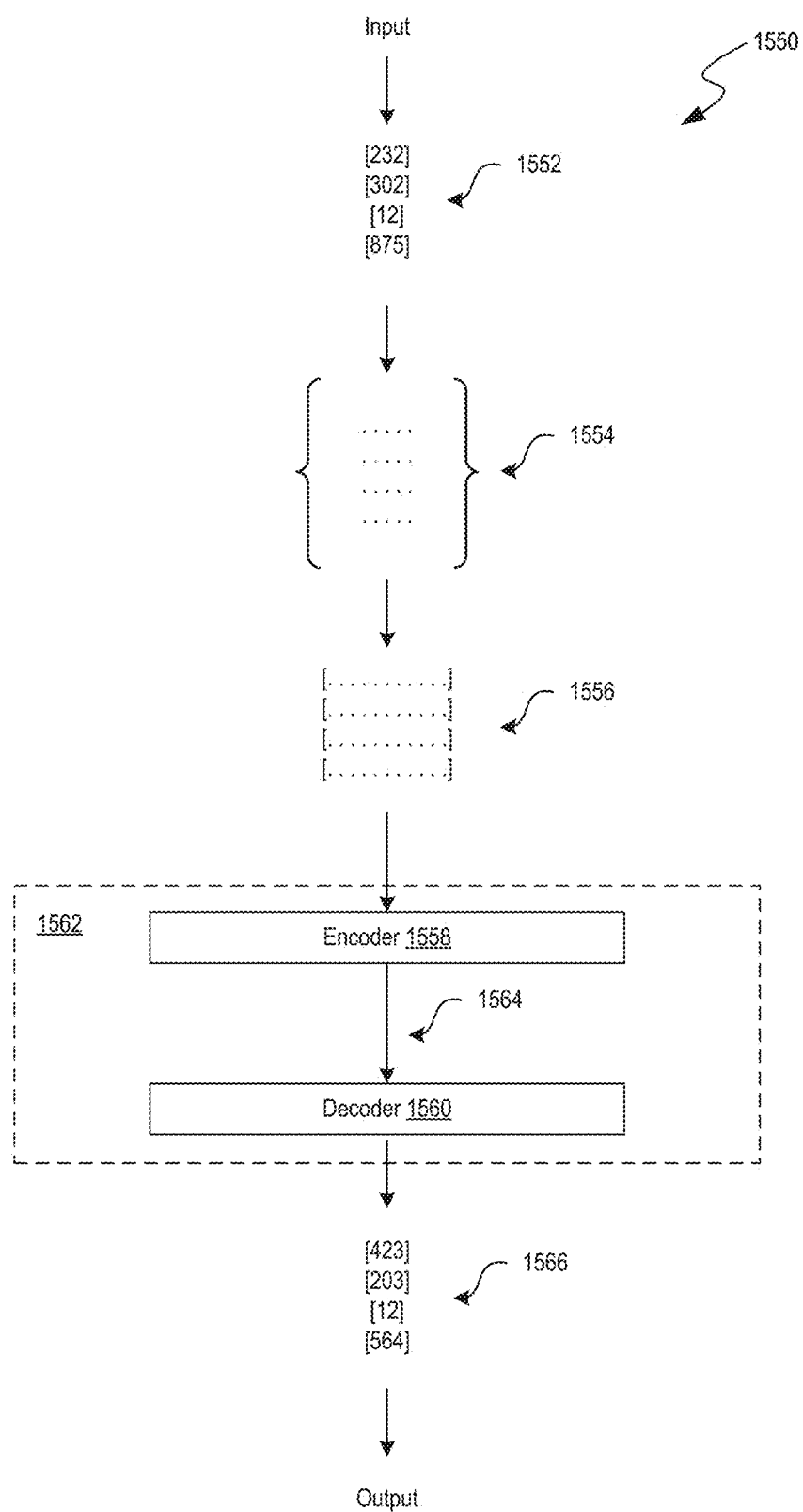
FIG. 15B is a block diagram illustrating an example adaptive model of a computing environment in which the disclosed system operates in some implementations of the present technology.

The at least one anomaly satisfying the corresponding dynamic threshold may be provided to adaptive model 1006. FIG. 15B shows an example adaptive model that may be used though the embodiments described herein are not so limited. The system may process, using adaptive model 1006, the at least one anomaly in the trend information for the corresponding user story identifier, to generate one or more recommended actions to address the at least one anomaly. Adaptive model 1006 may be trained on the past system data streams and the past trend information to generate one or more recommended actions to address one or more anomalies in the trend information for the input user story identifier. The output of adaptive model 1006 may be used by the system to generate for inclusion in a graphical user interface the recommended actions to address the at least one anomaly.

In some implementations, an enhanced Statistical Language Model (SLM) employs sophisticated neural network architectures, typically Deep Neural Networks (DNNs), to execute a broad spectrum of natural language processing (NLP) tasks. These models are trained to understand and predict the relationships between words in a text sequence by utilizing probabilistic methods. Enhanced SLMs can encompass millions or even billions of parameters, enabling them to handle complex tasks such as text generation, language translation, summarization, question answering, code writing, text classification, and diverse content creation for applications like social media, factual reporting, and marketing.

Prominent among the architectures within enhanced SLMs is the transformer, which leverages self-attention mechanisms to generate sequentially meaningful outputs from input data. Transformers are built with an encoder-decoder framework, each consisting of multiple neural network layers, including self-attention layers. The encoder processes the input text into high-dimensional feature vectors, while the decoder transforms these feature vectors into coherent output sequences. This architecture empowers the model to perform varied tasks such as content summarization, idea brainstorming, drafting in specific styles, grammar and spell checking, and multi-language translation.

Enhanced SLMs are accessible remotely through software interfaces or APIs, allowing integration with various applications. Models like GPT-3 and ChatGPT, which are based on transformer architectures, can be accessed via cloud-based services. These models excel in processing large volumes of input data and generating contextually relevant and coherent outputs, making them ideal for real-time or near real-time applications. Moreover, the use of natural language prompts, which provide specific instructions, significantly enhances the model's ability to deliver precise outputs based on given examples, broadening their utility in numerous practical scenarios.

Figure 11:
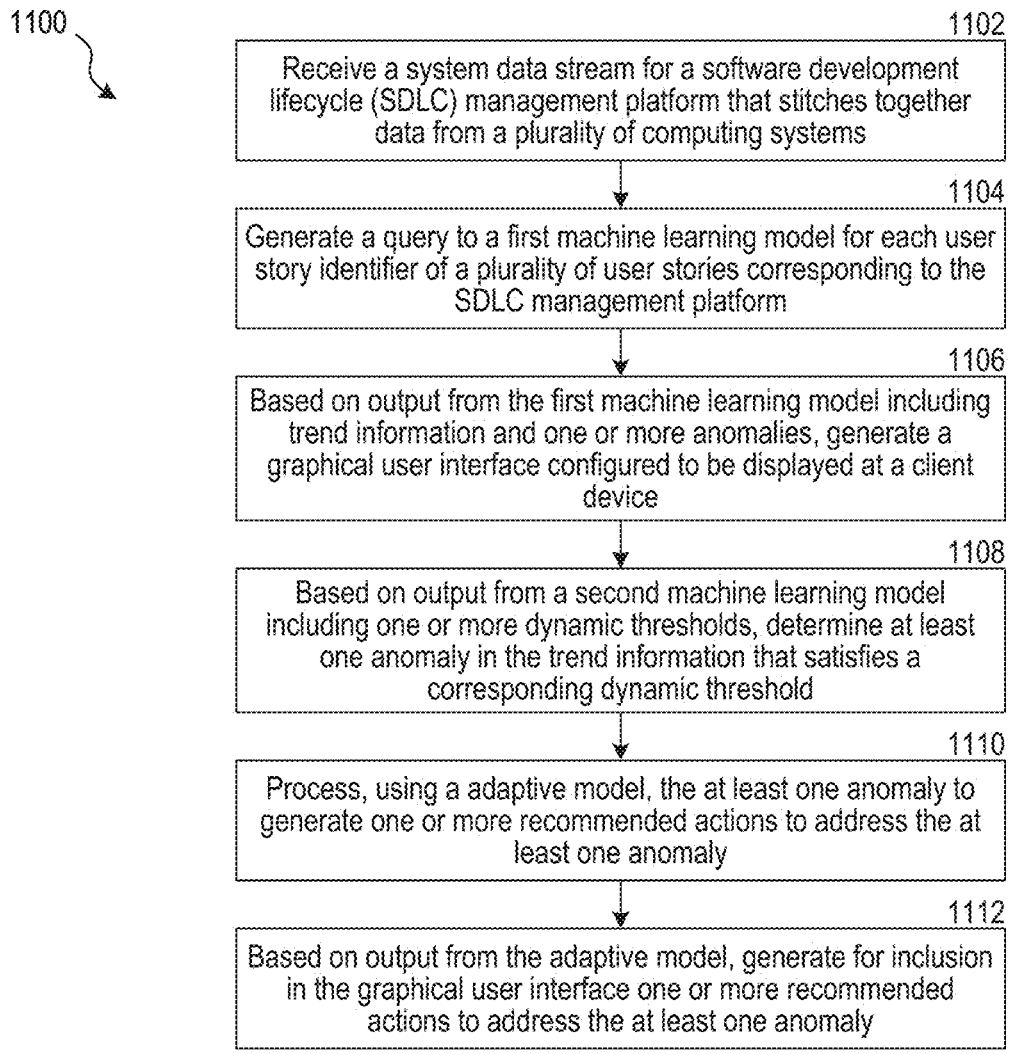
FIG. 11 is another flow diagram illustrating an example process for a software development lifecycle traceability tool that can be executed by the disclosed system in some implementations of the present technology.
Figure 12:
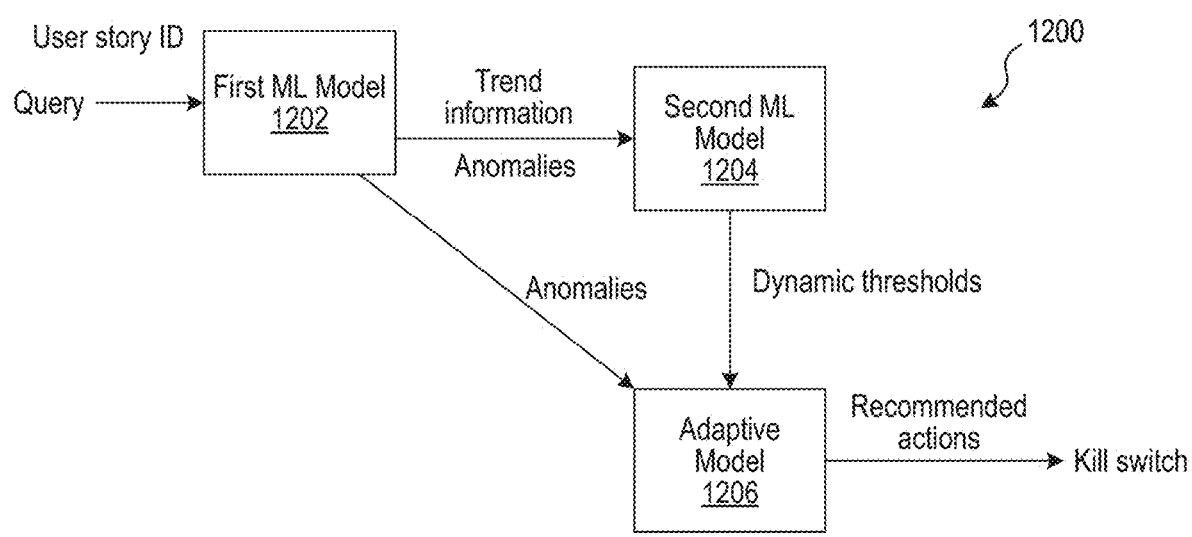
FIG. 12 is yet another block diagram illustrating example data flow for a software development lifecycle traceability tool in some implementations of the present technology.

In some implementations, the entire process, from initial anomaly detection to recommended actions, can be automated or involve a human-in-the-loop setup for feedback and continuous improvement. For instance, FIG. 11 illustrates a flow diagram 1100, detailing an example process in which the analytics system generates and evaluates trend information to predict and address potential issues across various stages of the software development lifecycle. FIG. 12 showcases another example of flow diagram 1200 where the traceability tool utilizes machine learning models and an adaptive model to handle more complex scenarios, ensuring robust mechanisms like triggering a kill switch if necessary. This situation prevents the propagation of larger issues by promptly addressing anomalies as they occur. The system's ability to adapt and learn from ongoing data streams, as well as integrate seamlessly with various toolsets such as JIRA, PTS, SNOW, and GitHub (illustrated in FIGS. 1 and 2), ensures comprehensive, real-time traceability and risk management, thus enhancing the overall efficiency of the software development lifecycle.

FIG. 11 is a flow diagram 1100 illustrating an example process for a traceability tool that leverages a mixed pipeline of machine learning models (e.g., classification models, etc.)

and adaptive models (e.g., large language models, enhanced supervised learning models, small language models, agentic architecture, or other suitable models), including a first machine learning model to generate trend information for user stories and identify anomalies in the trend information, a second machine learning model to determine dynamic thresholds for the identified anomalies, and an adaptive model to generate recommended actions for an anomaly that satisfies its corresponding dynamic threshold.

In operation, at 1102, the analytics system 110 receives a system data stream for a software development lifecycle (SDLC) management platform that stitches together data from a plurality of computing systems, e.g., as initially illustrated in FIG. 3.

In some implementations, the analytics system 110 may receive a first machine learning model trained based on past system data streams to generate trend information for one or more metrics and identify one or more anomalies in the trend information for an input user story identifier. In some implementations, the first machine learning model may include a recurrent neural network (RNN) trained based on the past system data streams to capture temporal dependencies in the trend information. FIG. 15A shows an example machine learning model that may be used though the embodiments described herein are not so limited.

In some implementations, the analytics system 110 may receive a second machine learning model trained based on past trend information to generate one or more dynamic thresholds for the one or more anomalies in the trend information for the input user story identifier. In some implementations, the second machine learning model may include a gradient boosting machine (GBM) that uses feature importance scores to dynamically adjust thresholds for anomalies based on severity and frequency metrics for past anomalies. FIG. 15A shows an example machine learning model that may be used though the embodiments described herein are not so limited.

In some implementations, the analytics system 110 may receive an adaptive model trained on the past system data streams and the past trend information to generate one or more recommended actions to address the one or more anomalies in the trend information for the input user story identifier. In some implementations, the adaptive model may include a Large Language Model (LLM) trained on the past system data streams and the past trend information to generate the one or more recommended actions. In some implementations, the adaptive model includes an enhanced Supervised Learning Model (SLM) trained on the past system data streams and the past trend information to generate the one or more recommended actions. FIG. 15B shows an example adaptive model that may be used though the embodiments described herein are not so limited.

At 1104, the analytics system 110 generates a query to the first machine learning model for each user story identifier of a plurality of user stories corresponding to the SDLC management platform.

At 1106, the analytics system 110, based on output from the first machine learning model including (i) trend information for the one or more metrics and (ii) the one or more anomalies in the trend information for each user story identifier, generates a graphical user interface configured to be displayed at a client device. The graphical user interface may include information for each user story of the plurality of user stories and corresponding progress tracking indicia.

At 1108, the analytics system 110, based on output from the second machine learning model including the one or more dynamic thresholds for the one or more anomalies in the trend information for a corresponding user story identifier, determines at least one anomaly that satisfies a corresponding dynamic threshold.

At 1110, the analytics system 110 processes, using the adaptive model, the at least one anomaly in the trend information for the corresponding user story identifier, to generate one or more recommended actions to address the at least one anomaly.

In some implementations, the adaptive model includes an LLM that uses attention mechanisms to focus on a most relevant portion of the trend information when generating the one or more recommended actions to address the at least one anomaly. The LLM may rank the one or more recommended actions to address the at least one anomaly based on a predicted effectiveness metric. The LLM may be integrated with a natural language processing (NLP) module to process user queries related to detected anomalies and recommended actions.

In some implementations, the adaptive model includes an enhanced SLM that uses ensemble learning techniques to combine predictions of multiple models for improved accuracy. The enhanced SLM may use a hierarchical model structure to handle different types of anomalies and generate context-specific recommended actions.

In some implementations, processing, using the adaptive model, the at least one anomaly in the trend information for the corresponding user story identifier includes processing, using the adaptive model, the at least one anomaly in the trend information for the corresponding user story identifier, to generate a confidence score for each recommended action of the one or more recommended actions. The confidence score may be based on a similarity of the at least one anomaly to past anomalies and an effectiveness metric of past recommended actions to address the past anomalies. In some implementations, the analytics system 110 determines a potential intervening action having a highest confidence score from the one or more recommended actions and, without user intervention, executes the potential intervening action to progress the corresponding user story identifier to a next stage of engineering involvement.

At 1112, the analytics system 110, based on output from the adaptive model including one or more recommended actions to address the at least one anomaly, generates for inclusion in the graphical user interface the one or more recommended actions to address the at least one anomaly. This comprehensive setup ensures seamless, data-driven decision-making across the SDLC, leveraging advanced models and interactive interfaces.

FIG. 12 is a block diagram 1200 illustrating example data flow for a traceability tool that leverages a combination of machine learning models (e.g., classification models) and an adaptive model (e.g., a large language model, an enhanced supervised learning model, a small language model, an agentic architecture, or another suitable model) to determine trend information for a user story, identify any anomalies, and execute a kill switch if appropriate. The system, e.g., analytics system 110 or another suitable system, may receive a query including a user story identifier for input to first machine learning model 1202. First machine learning model 1202 may be trained based on past system data streams to generate trend information for one or more metrics and identify one or more anomalies in the trend information for an input user story identifier. FIG. 15A shows an example machine learning model that may be used though the embodiments described herein are not so limited. The output of first machine learning model 1202 may include (i) trend information for one or more metrics and (ii) one or more anomalies in the trend information for the user story identifier. The system may generate a graphical user interface configured to be displayed at a client device. The graphical user interface may include information for each user story and corresponding progress tracking indicia.

The output from first machine learning model 1202 may be provided as input to second machine learning model 1204. Second machine learning model 1204 may be trained based on past trend information to generate one or more dynamic thresholds for the one or more anomalies in the trend information for the input user story identifier. FIG. 15A shows an example machine learning model that may be used though the embodiments described herein are not so limited. The output of second machine learning model 1204 may include one or more dynamic thresholds for the one or more anomalies in the trend information for a corresponding user story identifier. The system may determine whether at least one anomaly satisfies a corresponding dynamic threshold.

The at least one anomaly satisfying the corresponding dynamic threshold may be provided to adaptive model 1006. The system may process, using the adaptive model, the at least one anomaly in the trend information for the corresponding user story identifier, to generate one or more recommended actions to address the at least one anomaly. Adaptive model 1006 may be trained on the past system data streams and the past trend information to generate one or more recommended actions to address one or more anomalies in the trend information for the input user story identifier. For example, the model might generate actions to address an unstable user story by proposing code refactoring or additional testing. FIG. 15B shows an example adaptive model that may be used though the embodiments described herein are not so limited. If the output of adaptive model 1006 does not include any recommended actions, the system may execute a kill switch for corresponding user story identifier. The system may generate for inclusion in a graphical user interface an indication of the kill switch being executed to address the at least one anomaly. To integrate with the system, users can visualize the kill switch execution and other actions through the GUI, ensuring transparency and effective management of the development process. This comprehensive setup, depicted across various figures, ensures the traceability tool leverages advanced machine learning and adaptive models to maintain the reliability and efficiency of the software development lifecycle, providing robust anomaly detection, dynamic thresholding, and actionable insights.

Figure 13:
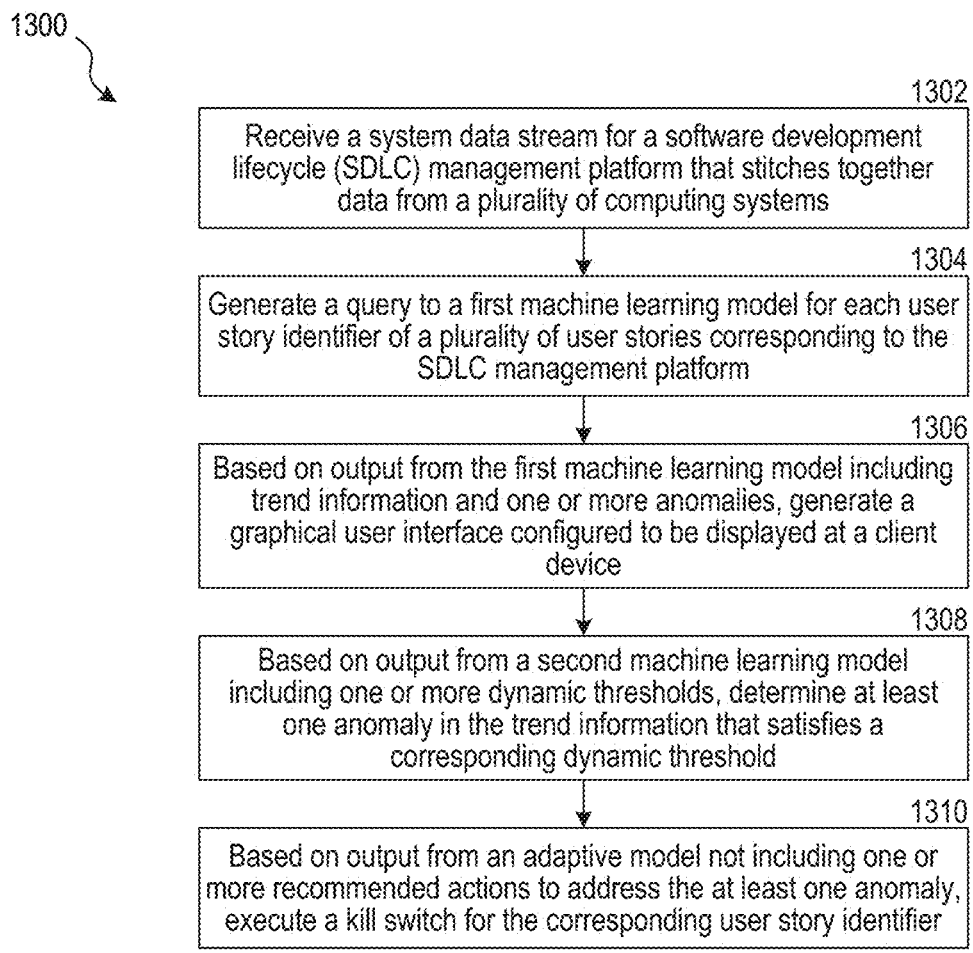
FIG. 13 is yet another flow diagram illustrating an example process for a software development lifecycle traceability tool that can be executed by the disclosed system in some implementations of the present technology.

FIG. 13 is a flow diagram 1300 illustrating an example process for a traceability tool that leverages a mixed pipeline of machine learning models (e.g., classification models, etc.) and adaptive models (e.g., large language models, enhanced supervised learning models, small language models, agentic architecture, or other suitable models), including a first machine learning model to generate trend information for user stories and identify anomalies in the trend information, a second machine learning model to determine dynamic thresholds for the identified anomalies, and when an adaptive model fails to generate any recommended actions for an anomaly, executes a kill switch for the corresponding user story.

In operation, at 1302, analytics system 110 generates a system data stream for a software development lifecycle (SDLC) management platform that stitches together data from a plurality of computing systems, e.g., as initially illustrated in FIG. 3.

In some implementations, analytics system 110 receives a first machine learning model trained based on past system data streams to generate trend information for one or more metrics and identify one or more anomalies in the trend information for an input user story identifier. In some implementations, the first machine learning model includes a recurrent neural network (RNN) trained based on the past system data streams to capture temporal dependencies in the trend information. FIG. 15A shows an example machine learning model that may be used though the embodiments described herein are not so limited.

In some implementations, analytics system 110 receives a second machine learning model trained based on past trend information to generate one or more dynamic thresholds for the one or more anomalies in the trend information for the input user story identifier. In some implementations, the second machine learning model includes a gradient boosting machine (GBM) that uses feature importance scores to dynamically adjust thresholds for anomalies based on severity and frequency metrics for past anomalies. FIG. 15A shows an example machine learning model that may be used though the embodiments described herein are not so limited. FIG. 15B shows an example adaptive model that may be used though the embodiments described herein are not so limited.

In some implementations, analytics system 110 receives an adaptive model trained on the past system data streams and the past trend information to generate one or more recommended actions to address the one or more anomalies in the trend information for the input user story identifier. In some implementations, the adaptive model includes a Large Language Model (LLM) trained on the past system data streams and the past trend information to generate the one or more recommended actions. In some implementations, the adaptive model includes an enhanced Supervised Learning Model (SLM) trained on the past system data streams and the past trend information to generate the one or more recommended actions.

At 1304, analytics system 110 generates a query to the first machine learning model for each user story identifier of a plurality of user stories corresponding to the SDLC management platform.

At 1306, analytics system 110, based on output from the first machine learning model including (i) trend information for the one or more metrics and (ii) the one or more anomalies in the trend information for each user story identifier, generates a graphical user interface configured to be displayed at a client device. The graphical user interface may include information for each user story of the plurality of user stories and corresponding progress tracking indicia.

At 1308, analytics system 110, based on output from the second machine learning model including the one or more dynamic thresholds for the one or more anomalies in the trend information for a corresponding user story identifier, determines at least one anomaly that satisfies a corresponding dynamic threshold.

At 1310, analytics system 110, based on output from an adaptive model not including one or more recommended actions to address the at least one anomaly, executes a kill switch for the corresponding user story identifier and generates for inclusion in the graphical user interface an indication of the kill switch being executed to address the at least one anomaly.

In some implementations, the adaptive model includes an LLM that uses attention mechanisms to focus on a most relevant portion of the trend information when generating the one or more recommended actions to address the at least one anomaly. The LLM may be integrated with a natural language processing (NLP) module to process user queries related to detected anomalies and recommended actions.

In some implementations, the adaptive model includes an enhanced SLM that uses ensemble learning techniques to combine predictions of multiple models for improved accuracy. The enhanced SLM uses a hierarchical model structure to handle different types of anomalies and generate context-specific recommended actions.

In some implementations, the output from the adaptive model not including one or more recommended actions to address the at least one anomaly includes processing, using the adaptive model, the at least one anomaly in the trend information for the corresponding user story identifier, to generate one or more potential intervening actions and a confidence score for each potential intervening action and determining that none of the one or more potential intervening actions have a confidence score exceeding a threshold. The confidence score may be based on a similarity of the at least one anomaly to past anomalies and an effectiveness metric of past recommended actions to address the past anomalies.

In some implementations, executing the kill switch for the corresponding user story identifier includes deactivating the corresponding user story identifier and preventing further progress until the at least one anomaly is resolved.

In some implementations, executing the kill switch for the corresponding user story identifier includes executing a fallback mechanism to revert a user story for the corresponding user story identifier to a previous stable state.

Figure 14:
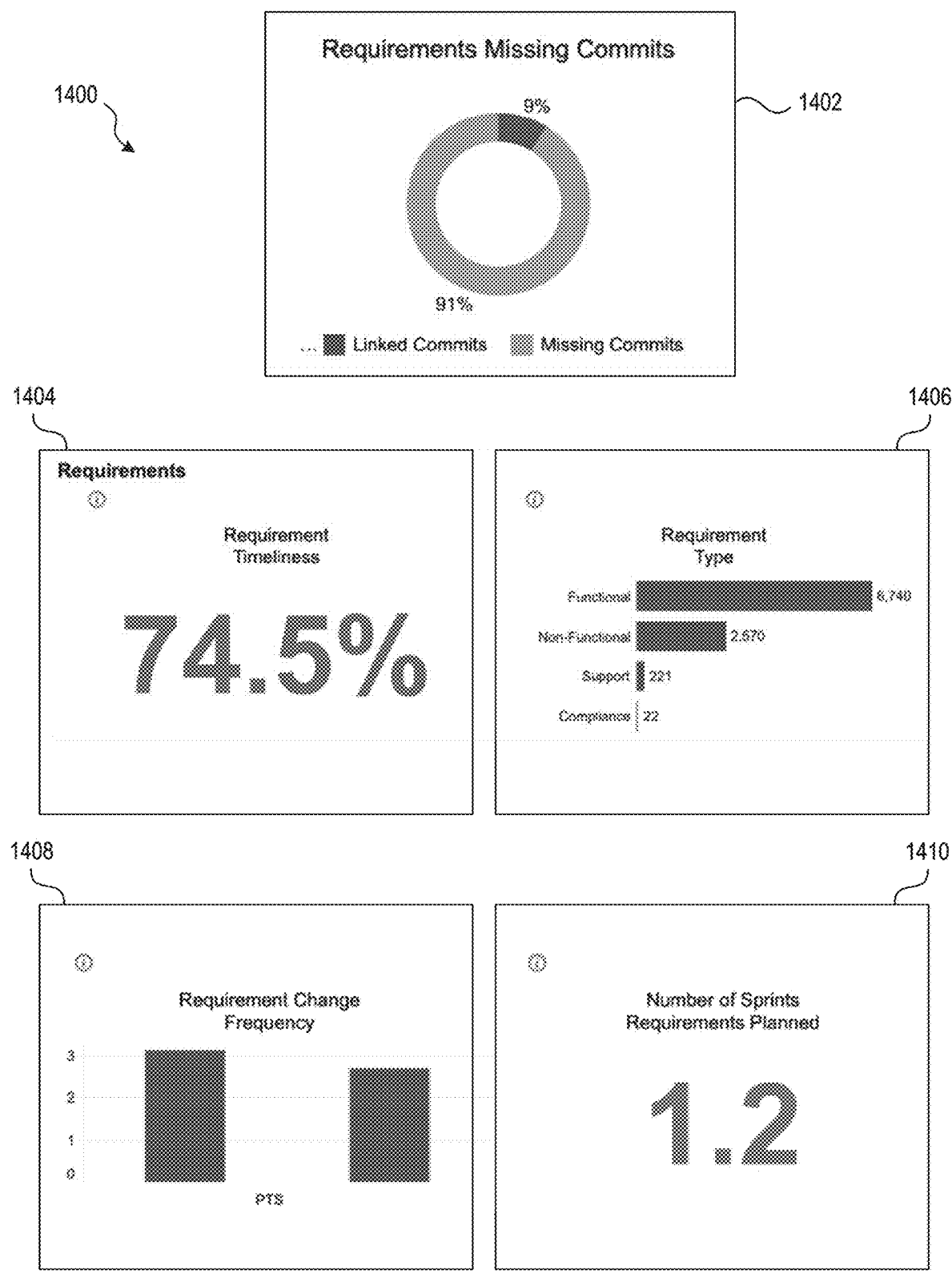
FIG. 14 is a GUI diagram illustrating yet another example display screen for a software development lifecycle traceability tool in some implementations of the present technology.

FIG. 14 is a GUI diagram 1400 illustrating an example display screen for a software development lifecycle traceability tool in some implementations of the present technology. GUI diagram 1400 showcases various exemplary insights that the system can provide to enhance traceability and decision-making during the software development lifecycle. Insight 1402 identifies requirements that have no code changes but were erroneously marked as complete. For example, the system might detect that a specific user story was marked complete in JIRA without any corresponding commits in GitHub, flagging potential oversight. Insight 1404 tracks requirement timeliness, highlighting requirements that are delayed or completed ahead of schedule. For instance, it may show that a particular functional requirement was delayed by two sprints, affecting overall project timelines. Insight 1406 categorizes requirements by type, such as functional, non-functional, support, and compliance, to better understand the change footprint across different categories. It provides a visual summary indicating the proportion of each requirement type. Insight 1408 calculates the average number of changes made to requirements for a user story per project. By analyzing historical data, the system can flag user stories with excessively frequent modifications (e.g., 15 times), indicating unstable requirements. Insight 1410 assesses backlog health by displaying the number of sprints' worth of requirements that are ready to be worked on. It enables better forecasting and planning, ensuring that the project has a steady pipeline of actionable items. Machine Learning Model(s) of the Example Analytics System(s)

FIG. 15A is a block diagram 1500 illustrating an example machine learning model 1502 of a computing environment in which the disclosed system operates in some implementations of the present technology. According to various implementations, analytics system 110 can include one or more machine learning models. The machine learning models can be structured to perform any suitable artificial intelligence-based operations to perform end-to-end traceability of software feature changes for various computing systems within an organization and/or the like. Machine learning models can include one or more convolutional neural networks (CNN), deep learning (DL) models, translational models, natural language processing (NLP) models, computer vision-based models, or any other suitable models for enabling the operations described herein.

In some implementations, the machine learning models, such as the machine learning model 1502, can include one or more neural networks. As an example, neural networks may be based on a large collection of neural units (or artificial neurons). Neural networks may loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit may have a summation function which combines the values of all its inputs together. In some embodiments, each connection (or the neural unit itself) may have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free-flowing, with connections interacting in a more chaotic and complex fashion.

As an example, machine learning model 1502 can ingest inputs 1504 and provide outputs 1506. In one use case, outputs 1506 can be fed back to a machine learning model as inputs to train the machine learning model (e.g., alone or in conjunction with user indications of the accuracy of outputs, labels associated with the inputs, or with other reference feedback information). In another use case, a machine learning model 1502 can update its configurations (e.g., weights, biases, or other parameters) based on its assessment of its prediction (e.g., outputs 1506) and reference feedback information (e.g., user indication of accuracy, reference labels, or other information). In another use case, where a machine learning model 1502 is a neural network, connection weights can be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this manner, for example, the machine learning model 1502 may be trained to generate better predictions.

As an example, where the prediction models include a neural network, the neural network can include one or more input layers, hidden layers, and output layers. The input and output layers can respectively include one or more nodes, and the hidden layers may each include a plurality of nodes. When an overall neural network includes multiple portions trained for different objectives, there may or may not be input layers or output layers between the different portions. The neural network can also include different input layers to receive various input data. Also, in differing examples, data can input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

FIG. 15B is a block diagram 1550 of an example adaptive model, such as transformer 1562, that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 1562 includes an encoder 1558 (which can comprise one or more encoder layers/blocks connected in series) and a decoder 1560 (which can comprise one or more decoder layers/blocks connected in series). Generally, the encoder 1558 and the decoder 1560 each include a plurality of neural network layers, at least one of which can be a self-attention layer. The parameters of the neural network layers can be referred to as the parameters of the language model.

The transformer 1562 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 1562 is trained to perform certain functions on other input formats than natural language input. For example, the input can include objects, images, audio content, or video content, or a combination thereof.

The transformer 1562 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 15B illustrates an example of how the transformer 1562 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 15B, a short sequence of tokens 1552 corresponding to the input text is illustrated as input to the transformer 1562. Tokenization of the text sequence into the tokens 1552 can be performed by some pre-processing tokenization module such as, for example, a byte-pair encoding tokenizer (the "pre" referring to the tokenization occurring prior to the processing of the tokenized input by the LLM), which is not shown in FIG. 15B for simplicity. In general, the token sequence that is inputted to the transformer 1562 can be of any length up to a maximum length defined based on the dimensions of the transformer 1562. Each token 1552 in the token sequence is converted into an embedding vector 1556 (also referred to simply as an embedding 1556). An embedding 1556 is a learned numerical representation (such as, for example, a vector) of a token that captures some semantic meaning of the text segment represented by the token 1552. The embedding 1556 represents the text segment corresponding to the token 1552 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 1556 corresponding to the "write" token will be closer to another embedding corresponding to the "jot down" token in the vector space as compared to the distance between the embedding 1556 corresponding to the "write" token and another embedding corresponding to the "summary" token.

The vector space can be defined by the dimensions and values of the embedding vectors. Various techniques can be used to convert a token 1552 to an embedding 1556. For example, another trained ML model can be used to convert the token 1552 into an embedding 1556. In particular, another trained ML model can be used to convert the token 1552 into an embedding 1556 in a way that encodes additional information into the embedding 1556 (e.g., a trained ML model can encode positional information about the position of the token 1552 in the text sequence into the embedding 1556). In some examples, the numerical value of the token 1552 can be used to look up the corresponding embedding in an embedding matrix 1554 (which can be learned during training of the transformer 1562).

The generated embeddings 1556 are input into the encoder 1558. The encoder 1558 serves to encode the embeddings 1556 into feature vectors 1564 that represent the latent features of the embeddings 1556. The encoder 1558 can encode positional information (i.e., information about the sequence of the input) in the feature vectors 1564. The feature vectors 1564 can have very high dimensionality (e.g., on the order of thousands or tens of thousands), with each element in a feature vector 1564 corresponding to a respective feature. The numerical weight of each element in a feature vector 1564 represents the importance of the corresponding feature. The space of all possible feature vectors 1564 that can be generated by the encoder 1558 can be referred to as the latent space or feature space.

Conceptually, the decoder 1560 is designed to map the features represented by the feature vectors 1564 into meaningful output, which can depend on the task that was assigned to the transformer 1562. For example, if the transformer 1562 is used for a translation task, the decoder 1560 can map the feature vectors 1564 into text output in a target language different from the language of the original tokens 1552. Generally, in a generative language model, the decoder 1560 serves to decode the feature vectors 514 into a sequence of tokens. The decoder 1560 can generate output tokens 1566 one by one. Each output token 1566 can be fed back as input to the decoder 1560 in order to generate the next output token 1566. By feeding back the generated output and applying self-attention, the decoder 1560 is able to generate a sequence of output tokens 1566 that has sequential meaning (e.g., the resulting output text sequence is understandable as a sentence and obeys grammatical rules). The decoder 1560 can generate output tokens 1566 until a special [EOT] token (indicating the end of the text) is generated. The resulting sequence of output tokens 1566 can then be converted to a text sequence in post-processing. For example, each output token 1566 can be an integer number that corresponds to a vocabulary index. By looking up the text segment using the vocabulary index, the text segment corresponding to each output token 1566 can be retrieved, the text segments can be concatenated together, and the final output text sequence can be obtained.

In some examples, the input provided to the transformer 1562 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

In some implementations, an enhanced Statistical Language Model (SLM) employs sophisticated neural network architectures, typically Deep Neural Networks (DNNs), to execute a broad spectrum of natural language processing (NLP) tasks. These models are trained to understand and predict the relationships between words in a text sequence by utilizing probabilistic methods. Enhanced SLMs can encompass millions or even billions of parameters, enabling them to handle complex tasks such as text generation, language translation, summarization, question answering, code writing, text classification, and diverse content creation for applications like social media, factual reporting, and marketing.

Prominent among the architectures within enhanced SLMs is the transformer, which leverages self-attention mechanisms to generate sequentially meaningful outputs from input data. Transformers are built with an encoder-decoder framework, each consisting of multiple neural network layers, including self-attention layers. The encoder processes the input text into high-dimensional feature vectors, while the decoder transforms these feature vectors into coherent output sequences. This architecture empowers the model to perform varied tasks such as content summarization, idea brainstorming, drafting in specific styles, grammar and spell checking, and multi-language translation.

Enhanced SLMs are accessible remotely through software interfaces or APIs, allowing integration with various applications. Models like GPT-3 and ChatGPT, which are based on transformer architectures, can be accessed via cloud-based services. These models excel in processing large volumes of input data and generating contextually relevant and coherent outputs, making them ideal for real-time or near real-time applications. Moreover, the use of natural language prompts, which provide specific instructions, significantly enhances the model's ability to deliver precise outputs based on given examples, broadening their utility in numerous practical scenarios.

According to various implementations, machine learning models and adaptive models can be trained based on information stored in a local data store associated with the analytics system 110 and/or a remote data store associated with the analytics system 110.

Example Architecture(s) of the Example Analytics System(s)

Figure 16:
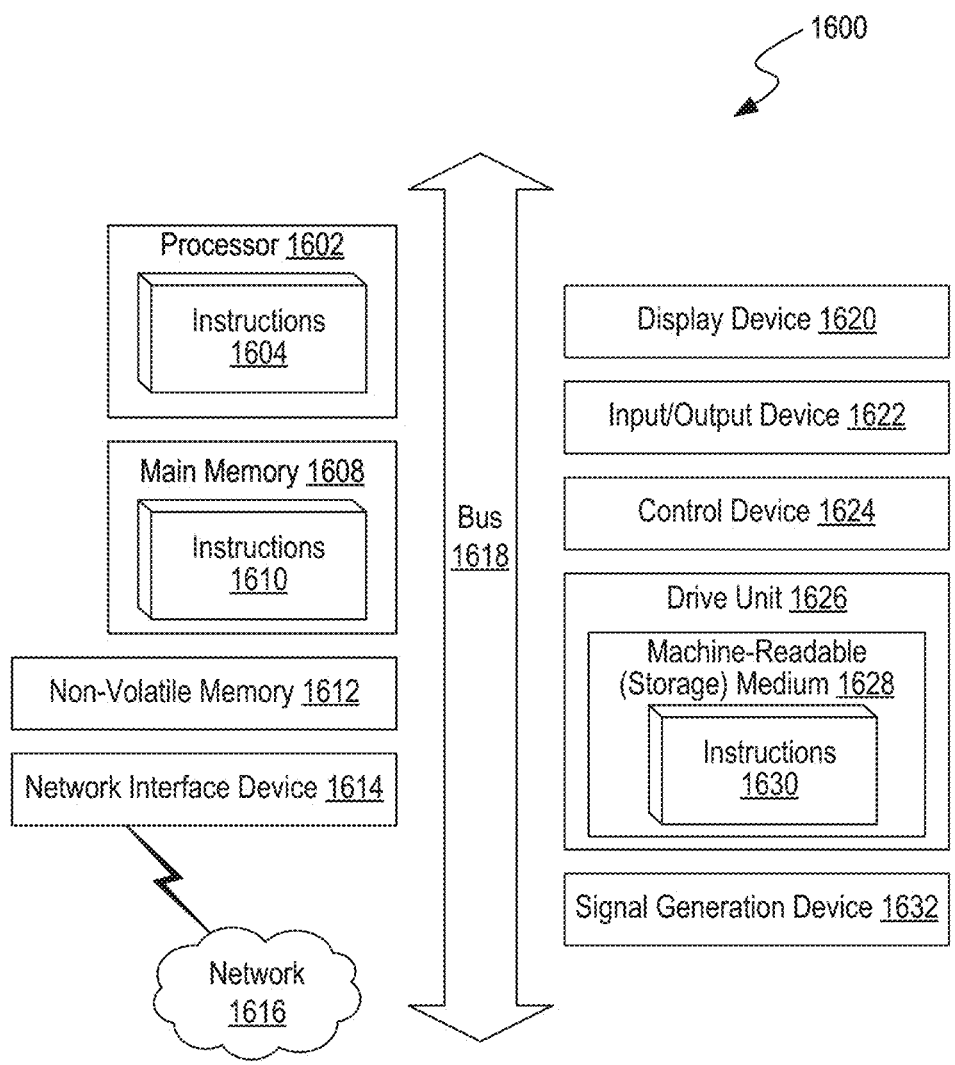
FIG. 16 is a block diagram illustrating an example of a computing environment in which the disclosed system operates in some implementations of the present technology.

FIG. 16 is a block diagram illustrating an example of a computing environment 1600 in which the disclosed system operates in some implementations of the present technology. In various implementations, these computer systems and other devices can include server computer systems, desktop computer systems, laptop computer systems, netbooks, mobile phones, personal digital assistants, televisions, cameras, automobile computers, electronic media players, etc. In various implementations, the computer systems and devices include zero or more of each of the following: a central processing unit (CPU) 1602 for executing computer programs, e.g., instructions 1604; a computer memory 1608 for storing programs and data, e.g., instructions 1610, while they are being used, including the facility and associated data, an operating system including a kernel, and device drivers; a persistent storage device or a non-volatile memory 1612, such as a hard drive or flash drive for persistently storing programs and data; a drive unit 1626 including computer-readable media drives 1628 that are tangible storage means that do not include a transitory, propagating signal, such as a floppy, CD-ROM, or DVD drive, for reading programs and data, e.g., instructions 1630, stored on a computer-readable medium; a network interface device 1614 with a network connection 1616 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like; a bus 1618; a display device 1620; an input/output device 1622; a control device 1624; and a signal generation device 1632. While computer systems configured as described above are typically used to support the operation of a facility, those skilled in the art will appreciate that the facility may be implemented using devices of various types and configurations, and having various components.

Figure 17:
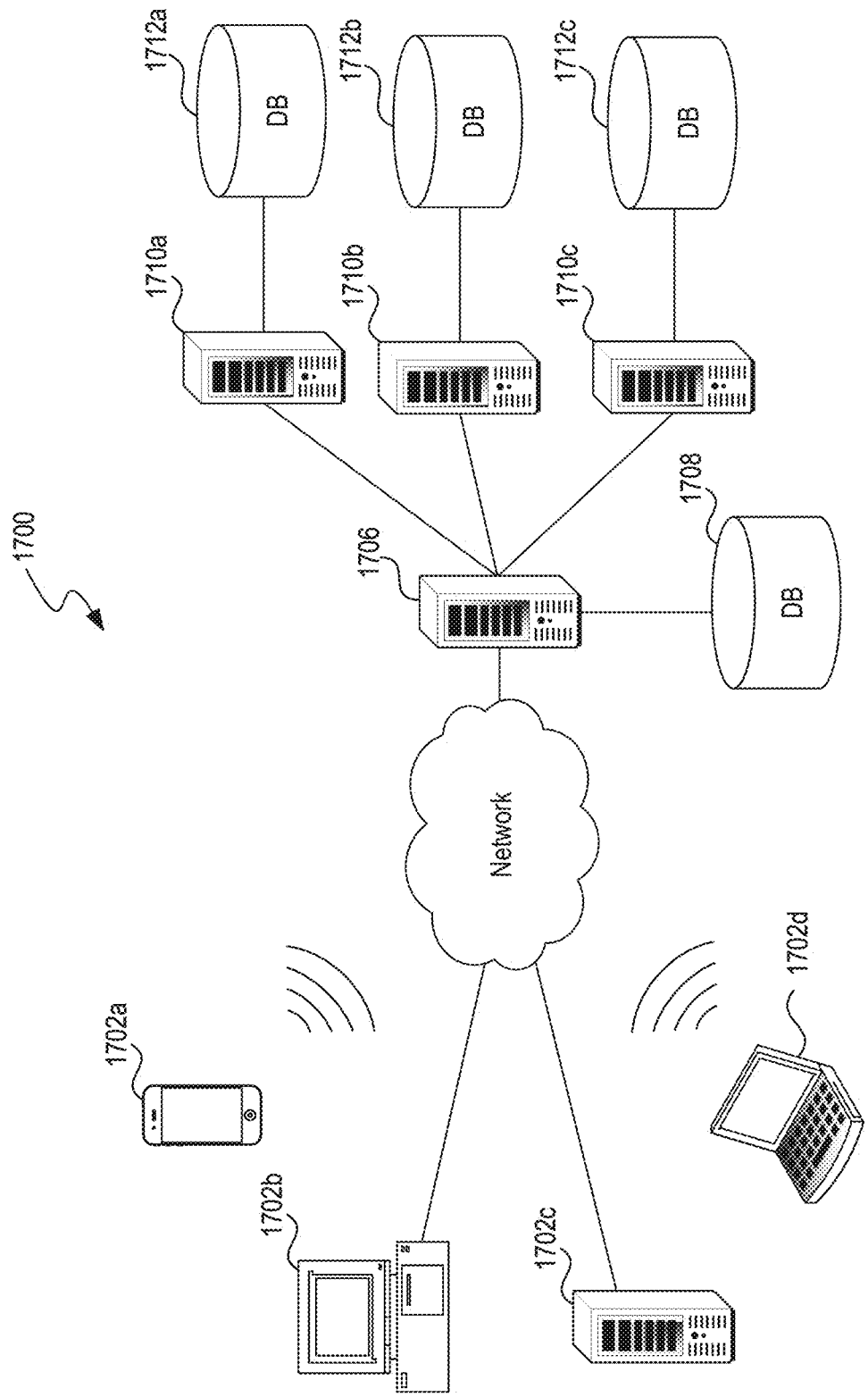
FIG. 17 is a system diagram showing some of the components typically incorporated in at least some of the computer systems and other devices on which the disclosed system operates in accordance with some implementations of the present technology.

FIG. 17 is a system diagram showing some of the components typically incorporated in at least some of the computer systems and other devices on which the disclosed system operates in accordance with some implementations of the present technology. In some implementations, environment 1700 includes one or more client computing devices 1702A-D, examples of which can host the analytics system 110. Client computing devices 1702A-D operate in a networked environment using logical connections through network 1704 to one or more remote computers, such as a server computing device.

In some implementations, server 1706 is an edge server which receives client requests and coordinates fulfillment of those requests through other servers, such as servers 1710A-C. In some implementations, server 1706 connects to a corresponding database 1708. In some implementations, server computing devices 1710A-C comprise computing systems, such as the analytics system 110. Though each server computing device 1710A-C is displayed logically as a single server, server computing devices can each be a distributed computing environment encompassing multiple computing devices located at the same or at geographically disparate physical locations. In some implementations, each server 1710A-C corresponds to a group of servers.

Client computing devices 1702A-D and server computing devices 1710A-C can each act as a server or client to other server or client devices. In some implementations, servers 1710A-C connect to a corresponding database 1712A-C. As discussed above, each server 1710A-C can correspond to a group of servers, and each of these servers can share a database or can have its own database. Databases 1712A-C warehouse (e.g., store) information such items included in various data streams. Though databases 1712A-C are displayed logically as single units, databases 1712A-C can each be a distributed computing environment encompassing multiple computing devices, can be located within their corresponding server, or can be located at the same or at geographically disparate physical locations.

Network 1704 can be a local area network (LAN) or a wide area network (WAN), but can also be other wired or wireless networks. In some implementations, network 1704 is the Internet or some other public or private network. Client computing devices 1702A-D are connected to network 1704 through a network interface, such as by wired or wireless communication. While the connections between server 1706 and servers 1710A-C are shown as separate connections, these connections can be any kind of local, wide area, wired, or wireless network, including network 1704 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. One or more non-transitory computer-readable media storing instructions, which when executed by at least one processor, perform operations comprising:
    generating a system data stream for a software development lifecycle (SDLC) management platform that stitches together data from a plurality of computing systems;
    receiving a first machine learning model trained based on past system data streams to generate trend information for one or more metrics and identify one or more anomalies in the trend information for an input user story identifier;
    receiving a second machine learning model trained based on past trend information to generate one or more dynamic thresholds for the one or more anomalies in the trend information for the input user story identifier;
    receiving an adaptive model trained on the past system data streams and the past trend information to generate one or more recommended actions to address the one or more anomalies in the trend information for the input user story identifier;
    generating a query to the first machine learning model for each user story identifier of a plurality of user stories corresponding to the SDLC management platform;
    based on output from the first machine learning model including (i) trend information for the one or more metrics and (ii) the one or more anomalies in the trend information for each user story identifier, generating a graphical user interface configured to be displayed at a client device, wherein the graphical user interface includes information for each user story of the plurality of user stories and corresponding progress tracking indicia;
    based on output from the second machine learning model including the one or more dynamic thresholds for the one or more anomalies in the trend information for a corresponding user story identifier, determining an anomaly from the one or more anomalies that satisfies a dynamic threshold corresponding to the anomaly; and
    based on output from an adaptive model not including one or more recommended actions to address the anomaly, executing a kill switch for the corresponding user story identifier and generating for inclusion in the graphical user interface the information for each user story of the plurality of user stories and corresponding progress tracking indicia and an indication of the kill switch being executed to address the anomaly.

2. A method for enhanced software development lifecycle (SDLC) management using a pipeline of machine learning and adaptive models for anomaly detection and termination, the method comprising:
    receiving a system data stream for a software development lifecycle (SDLC) management platform that stitches together data from a plurality of computing systems;
    generating a query to a first machine learning model for each user story identifier of a plurality of user stories corresponding to the SDLC management platform, wherein the first machine learning model generates trend information for one or more metrics and identifies one or more anomalies in the trend information for an input user story identifier;
    based on output from the first machine learning model including (i) trend information for the one or more metrics and (ii) the one or more anomalies in the trend information for each user story identifier, generating one or more components of a graphical user interface configured to be displayed at a client device, wherein the one or more components of the graphical user interface comprise information for one or more user stories of the plurality of user stories and corresponding progress tracking indicia;
    based on output from a second machine learning model including one or more dynamic thresholds for the one or more anomalies in the trend information for a corresponding user story identifier, determining an anomaly from the one or more anomalies that satisfies a dynamic threshold corresponding to the anomaly, wherein the second machine learning model generates the one or more dynamic thresholds for the one or more anomalies in the trend information for the input user story identifier; and
    based on output from an adaptive model not including one or more recommended actions to address the anomaly, executing a kill switch for the corresponding user story identifier and generating for inclusion in the graphical user interface the information for each user story of the plurality of user stories and corresponding progress tracking indicia and an indication of the kill switch being executed to address the anomaly, wherein the adaptive model generates one or more recommended actions to address the one or more anomalies in the trend information for the input user story identifier.

3. The method of claim 2, wherein the output from the adaptive model not including one or more recommended actions to address the anomaly includes:
    processing, using the adaptive model, the anomaly in the trend information for the corresponding user story identifier, to generate one or more potential intervening actions and a confidence score for each potential intervening action, wherein the confidence score is based on a similarity of the anomaly to past anomalies and an effectiveness metric of past recommended actions to address the past anomalies; and
    determining that none of the one or more potential intervening actions have a confidence score exceeding a threshold.

4. The method of claim 2, wherein executing the kill switch for the corresponding user story identifier includes:
    deactivating the corresponding user story identifier and preventing further progress until the anomaly is resolved.

5. The method of claim 2, wherein executing the kill switch for the corresponding user story identifier includes:
    executing a fallback mechanism to revert a user story for the corresponding user story identifier to a previous stable state.

6. The method of claim 2, wherein the first machine learning model includes a recurrent neural network (RNN) trained based on past system data streams to capture temporal dependencies in the trend information.

7. The method of claim 2, wherein the second machine learning model includes a gradient boosting machine (GBM) that uses feature importance scores to dynamically adjust thresholds for anomalies based on severity and frequency metrics for past anomalies.

8. The method of claim 2, wherein the adaptive model includes a Large Language Model (LLM) trained on past system data streams and past trend information to generate the one or more recommended actions, wherein the LLM is integrated with a natural language processing (NLP) module to process user queries related to detected anomalies and recommended actions.

9. The method of claim 8, wherein the LLM uses attention mechanisms to focus on a most relevant portion of the trend information when generating the one or more recommended actions to address the anomaly.

10. The method of claim 2, wherein the adaptive model includes an enhanced Supervised Learning Model (SLM) trained on past system data streams and past trend information to generate the one or more recommended actions, wherein the enhanced SLM uses ensemble learning techniques to combine predictions of multiple models for improved accuracy.

11. The method of claim 10, wherein the enhanced SLM uses a hierarchical model structure to handle different types of anomalies and generate context-specific recommended actions.

12. A system comprising at least one processor and one or more non-transitory, computer-readable media having instructions stored thereon that, when executed by the at least one processor, cause the at least one processor to perform operations comprising:
receiving a system data stream for a software development lifecycle (SDLC) management platform that stitches together data from a plurality of computing systems;
generating a query to a first machine learning model for each user story identifier of a plurality of user stories corresponding to the SDLC management platform, wherein the first machine learning model generates trend information for one or more metrics and identifies one or more anomalies in the trend information for an input user story identifier;
based on output from the first machine learning model including (i) trend information for the one or more metrics and (ii) the one or more anomalies in the trend information for each user story identifier, generating a graphical user interface configured to be displayed at a client device, wherein the graphical user interface includes information for each user story of the plurality of user stories and corresponding progress tracking indicia;
based on output from a second machine learning model including one or more dynamic thresholds for the one or more anomalies in the trend information for a corresponding user story identifier, determining an anomaly from the one or more anomalies that satisfies a dynamic threshold corresponding to the anomaly, wherein the second machine learning model generates the one or more dynamic thresholds for the one or more anomalies in the trend information for the input user story identifier; and
based on output from an adaptive model not including one or more recommended actions to address the anomaly, executing a kill switch for the corresponding user story identifier and generating for inclusion in the graphical user interface the information for each user story of the plurality of user stories and corresponding progress tracking indicia and an indication of the kill switch being executed to address the anomaly, wherein the adaptive model generates one or more recommended actions to address the one or more anomalies in the trend information for the input user story identifier.

13. The system of claim 12, wherein the output from the adaptive model not including one or more recommended actions to address the anomaly includes:
processing, using the adaptive model, the anomaly in the trend information for the corresponding user story identifier, to generate one or more potential intervening actions and a confidence score for each potential intervening action, wherein the confidence score is based on a similarity of the anomaly to past anomalies and an effectiveness metric of past recommended actions to address the past anomalies; and
determining that none of the one or more potential intervening actions have a confidence score exceeding a threshold.

14. The system of claim 12, wherein executing the kill switch for the corresponding user story identifier includes:
deactivating the corresponding user story identifier and preventing further progress until the anomaly is resolved.

15. The system of claim 12, wherein executing the kill switch for the corresponding user story identifier includes:
executing a fallback mechanism to revert a user story for the corresponding user story identifier to a previous stable state.

16. The system of claim 12, wherein the first machine learning model includes a recurrent neural network (RNN) trained based on past system data streams to capture temporal dependencies in the trend information.

17. The system of claim 12, wherein the second machine learning model includes a gradient boosting machine (GBM) that uses feature importance scores to dynamically adjust thresholds for anomalies based on severity and frequency metrics for past anomalies.

18. The system of claim 12, wherein the adaptive model includes a Large Language Model (LLM) trained on past system data streams and past trend information to generate the one or more recommended actions, wherein the LLM is integrated with a natural language processing (NLP) module to process user queries related to detected anomalies and recommended actions, wherein the LLM uses attention mechanisms to focus on a most relevant portion of the trend information when generating the one or more recommended actions to address the anomaly.

19. The system of claim 12, wherein the adaptive model includes an enhanced Supervised Learning Model (SLM) trained on past system data streams and past trend information to generate the one or more recommended actions, wherein the enhanced SLM uses ensemble learning techniques to combine predictions of multiple models for improved accuracy.

20. The system of claim 19, wherein the enhanced SLM uses a hierarchical model structure to handle different types of anomalies and generate context-specific recommended actions.

* * * * *